(12) United States Patent
Uruma

(10) Patent No.: US 7,706,003 B2
(45) Date of Patent: Apr. 27, 2010

(54) IMAGE FORMING APPARATUS, AND CONTROL METHOD OF THE SAME

(75) Inventor: Kazuhiro Uruma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1087 days.

(21) Appl. No.: 11/195,643

(22) Filed: Aug. 3, 2005

(65) Prior Publication Data

US 2006/0028661 A1 Feb. 9, 2006

(30) Foreign Application Priority Data

Aug. 6, 2004 (JP) ............................. 2004-231437
Jul. 19, 2005 (JP) ............................. 2005-208061

(51) Int. Cl.
*H04N 1/00* (2006.01)
*H04N 15/00* (2006.01)
*H04N 1/04* (2006.01)
*H04N 1/46* (2006.01)

(52) U.S. Cl. .................. 358/1.14; 358/400; 358/437; 358/474; 358/505

(58) Field of Classification Search ........... 358/400, 358/474, 505, 437, 1.14
See application file for complete search history.

(56) References Cited

U.S. PATENT DOCUMENTS 6,791,703 B1 * 9/2004 Maeda et al. ............. 358/1.15

2001/0013954 A1 8/2001 Nagai et al. ............... 358/444
2002/0054281 A1 * 5/2002 Yamada ..................... 355/53
2004/0073817 A1 * 4/2004 Liu et al. .................. 713/300
2005/0002065 A1 * 1/2005 Kotaka et al. .............. 358/400
2006/0007469 A1 1/2006 Uruma ..................... 358/1.14

FOREIGN PATENT DOCUMENTS

| EP | 0 478 355 A2 | 4/1992 |
| EP | 1 229 726 A1 | 8/2002 |
| JP | 61-269719 | 11/1986 |
| JP | 2000-103146 | 4/2000 |
| JP | 2000-250362 | 9/2000 |
| JP | 2001-113762 | 4/2001 |
| JP | 2001-265174 | 9/2001 |
| JP | 2002-50362 | 2/2002 |
| JP | 2003-338889 | 11/2003 |

OTHER PUBLICATIONS

Office Action, dated Dec. 11, 2008, in EP 05 524 878.1.

* cited by examiner

*Primary Examiner*—Benny Q Tieu
*Assistant Examiner*—Ngon Nguyen
(74) *Attorney, Agent, or Firm*—Fitzpatrick, Cella, Harper & Scinto

(57) ABSTRACT

When a shutdown instruction is input, whether there is a job under execution or a waiting job is determined (S604). A list of information on a job under execution, if it is found, and information on a waiting job, if it is found, is displayed (S611). After the list is displayed, a control process pertaining to shutdown is performed.

15 Claims, 20 Drawing Sheets

FIG. 15

PLEASE TURN OFF MAIN POWER SUPPLY ON RIGHT SIDE OF MAIN BODY.

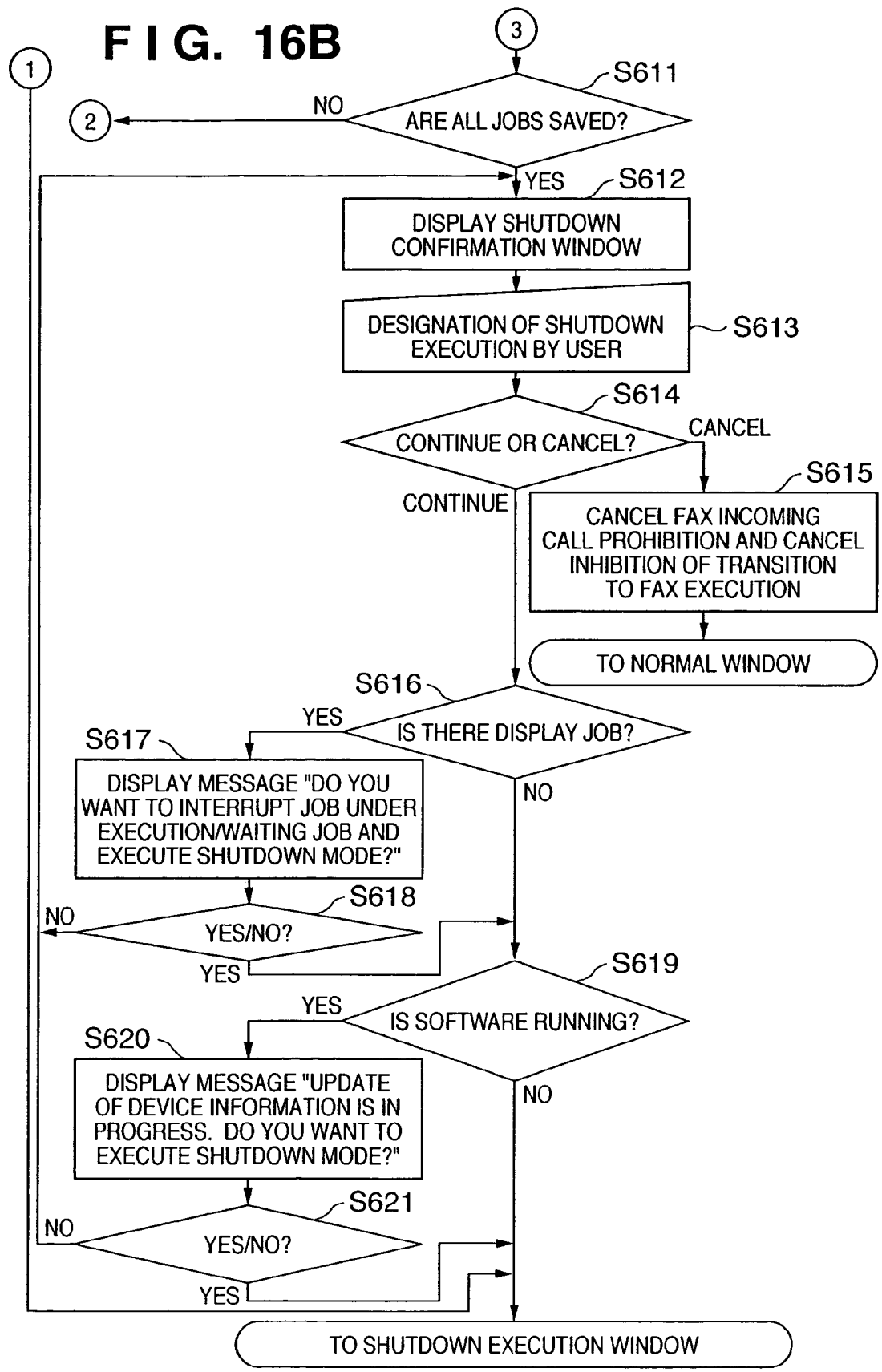

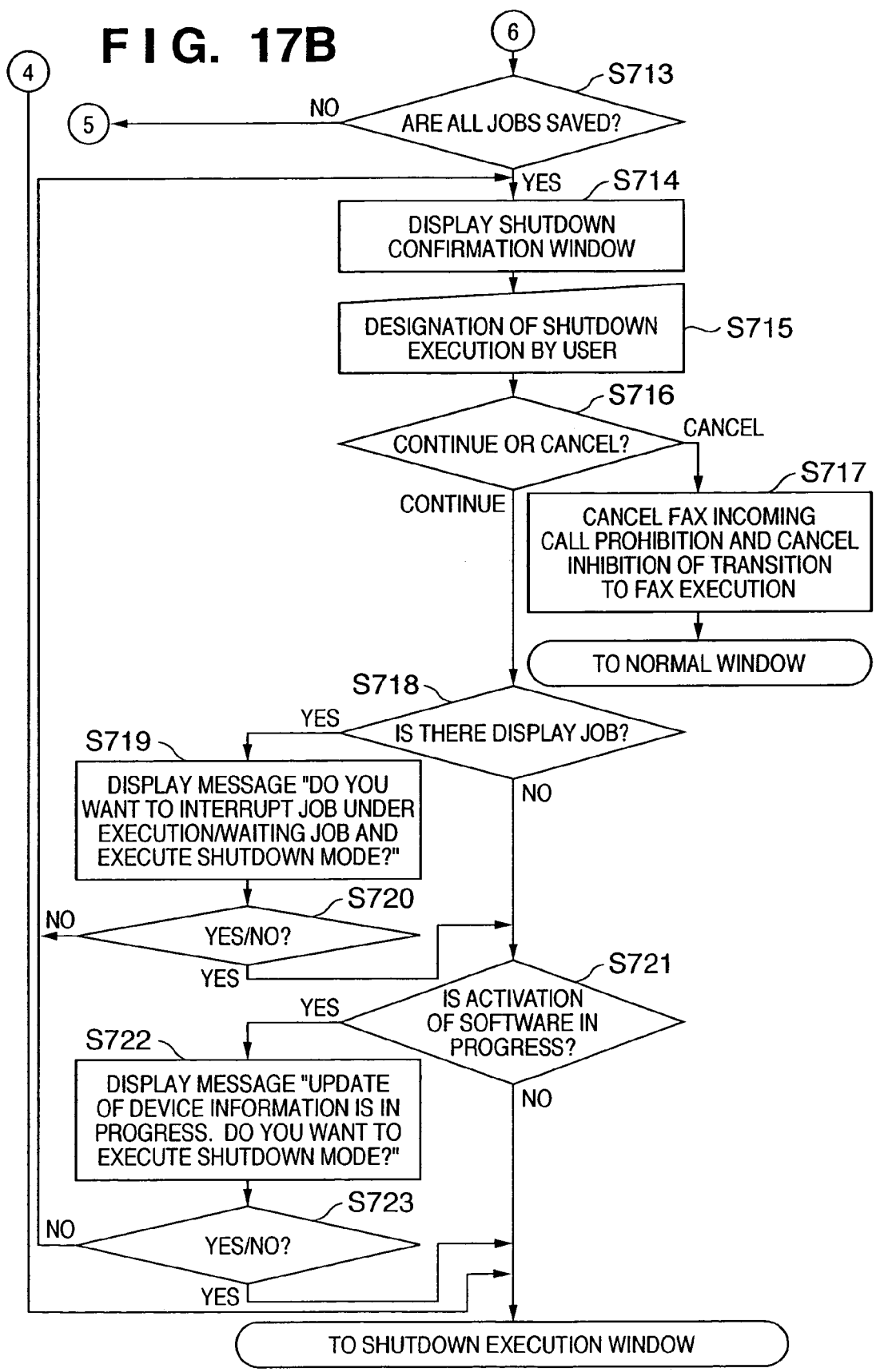

IMAGE FORMING APPARATUS, AND CONTROL METHOD OF THE SAME

FIELD OF THE INVENTION

The present invention relates to a technique for shutting down the power supply of an image forming apparatus.

BACKGROUND OF THE INVENTION

Recently, various functions of, e.g., a copying machine and printer used in an office are beginning to be installed in a single apparatus, and an image processing apparatus called a digital multifunction peripheral (MFP) is put on the market. This MFP is obtained by installing a printer controller having an image processing function in a copying machine, and has functions of both the copying machine and printer. The number of functions of the MFP is more and more increased by further adding a facsimile function and the like.

Conventionally, some digital MFPs have a sleep mode in order to reduce the power consumption when they are not in use.

Since, however, electric power is slightly consumed even in this sleep mode, some users shut down the main power supply. Also, the final user more and more desires to shut down the power supply of the main body because the security awareness increases in recent years.

Accordingly, some recent digital MFPs have a mode called a shutdown mode in which the main power supply is shut down after all input jobs are completed.

For example, Japanese Patent Laid-Open No. 2001-265174 describes that if an image forming operation is under execution when an instruction to shut down the main power supply is accepted, a message indicating that the instruction to shut down the main power supply is accepted is displayed, and the main power supply is shut down after the image forming operation is completed.

In the conventional apparatus, however, a message indicating that the power supply shutdown instruction is accepted is displayed, but no information about how will presently input jobs be executed is displayed.

For example, neither a message indicating presently input jobs nor a message indicating jobs to be recovered and jobs not to be recovered when the power supply is shut down is displayed. In addition, a print job (called a secure print job) which is input as a job but is not executed unless a predetermined operation including the inputting of a password is performed is displayed as a job waiting for execution, but is not executed unless the predetermined operation is performed. No message taking account of (the state of) a job like this is displayed.

Accordingly, the user can know the existence of a job waiting for execution or a job under execution, but cannot know the timing at which the power supply can be shut down without any job disappearance (cancellation). Also, if a storage type job, such as the secure print job described above, which is not executed unless a predetermined operation is performed is input, it is difficult for the user to know the existence of this storage type job.

SUMMARY OF THE INVENTION

The present invention has been made in consideration of the above situation, and has as its object to provide a technique which notifies, before shutdown is performed, a user of a job which is affected by the shutdown process.

In order to achieve an object of the present invention, for example, an image processing apparatus of the present invention comprises the following arrangement.

That is, an image processing apparatus which performs image processing on the basis of an input job, comprises:
holding unit adapted to hold information on an input job;
determining unit adapted to determine whether there is a job under execution or whether there is a waiting job, when a shutdown instruction to shut down a power supply of the image processing apparatus is input;
display unit adapted to display information on a job under execution if the job under execution is found by the determination by the determining unit, or information on a waiting job if the waiting job is found by the determination by the determining unit; and
shutdown control unit adapted to perform a control process of shutting down the power supply of the image processing apparatus, if a shutdown continuation instruction is input after the list is displayed by the display unit.

In order to achieve an object of the present invention, for example, a control method of the present invention comprises the following arrangement.

That is, a control method of an image processing apparatus which performs image processing on the basis of an input job, comprises:
a holding step of holding information on an input job in a memory;
a determination step of determining whether there is a job under execution or whether there is a waiting job, on the basis of the information held in the memory, when a shutdown instruction to shut down a power supply of the image processing apparatus is input;
a display step of displaying information on a job under execution if the job is found by the determination process in the determination step, or information on a waiting job if the job is found by the determination process in the determination step; and
a shutdown control step of performing a control process of shutting down the power supply of the image processing apparatus, if a shutdown continuation instruction is input after the list is displayed in the list display step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a view showing an example of the display of a window displayed when the shutdown process is completed;

FIGS. 16A and 16B are flowcharts of a series of processes of displaying a first shutdown confirmation window, and advancing to the shutdown execution window;

FIGS. 17A and 17B are flowcharts of a series of processes of displaying a second shutdown confirmation window, and advancing to the shutdown execution window.

DETAILED DESCRIPTION OF THE PREFERRED EMBODIMENTS

Preferred embodiments of the present invention will now be described in detail in accordance with the accompanying drawings.

First Embodiment

System Configuration

Figure 1:
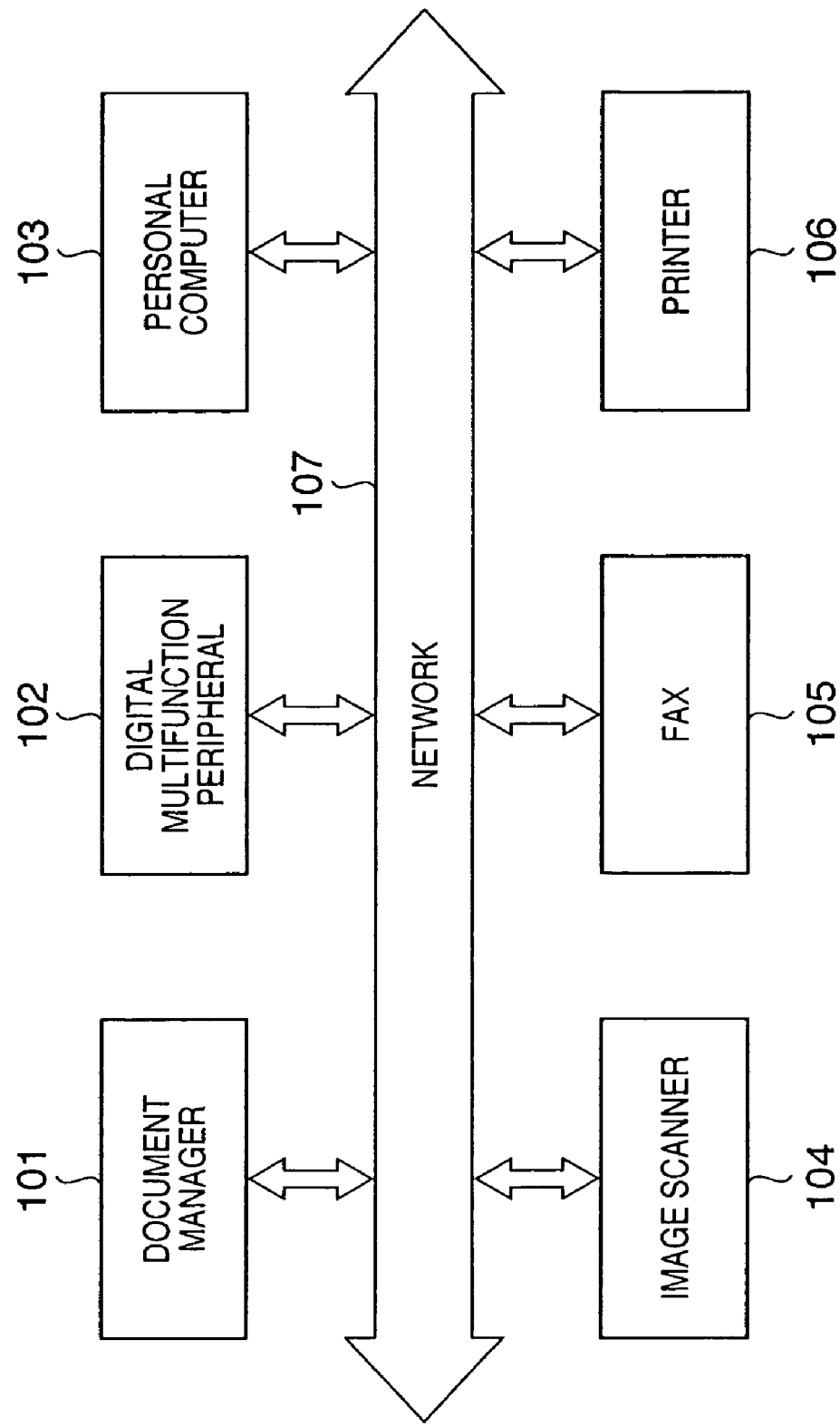
FIG. 1 is a block diagram showing an example of the basic configuration of a system including an image forming apparatus according to the first embodiment of the present invention.

FIG. 1 is a block diagram showing an example of the basic configuration of a system including an image forming apparatus according to this embodiment.

As shown in FIG. 1, a document manager 101, a digital multifunction peripheral (MFP) 102 having a scanner function and printer function as an image forming apparatus according to this embodiment, a personal computer (PC) 103, an image scanner 104, a facsimile apparatus (FAX) 105, and a printer 106 are connected to each other by a network 107 such as a LAN or the Internet. Note that the network 107 is not limited to these types, and can be either a wireless or wired network.

In the following explanation, the digital MFP 102, image scanner 104, FAX 105, and printer 106 will be collectively referred to as an image forming apparatus in some cases.

<Configuration of Digital MFP>

Figure 2:
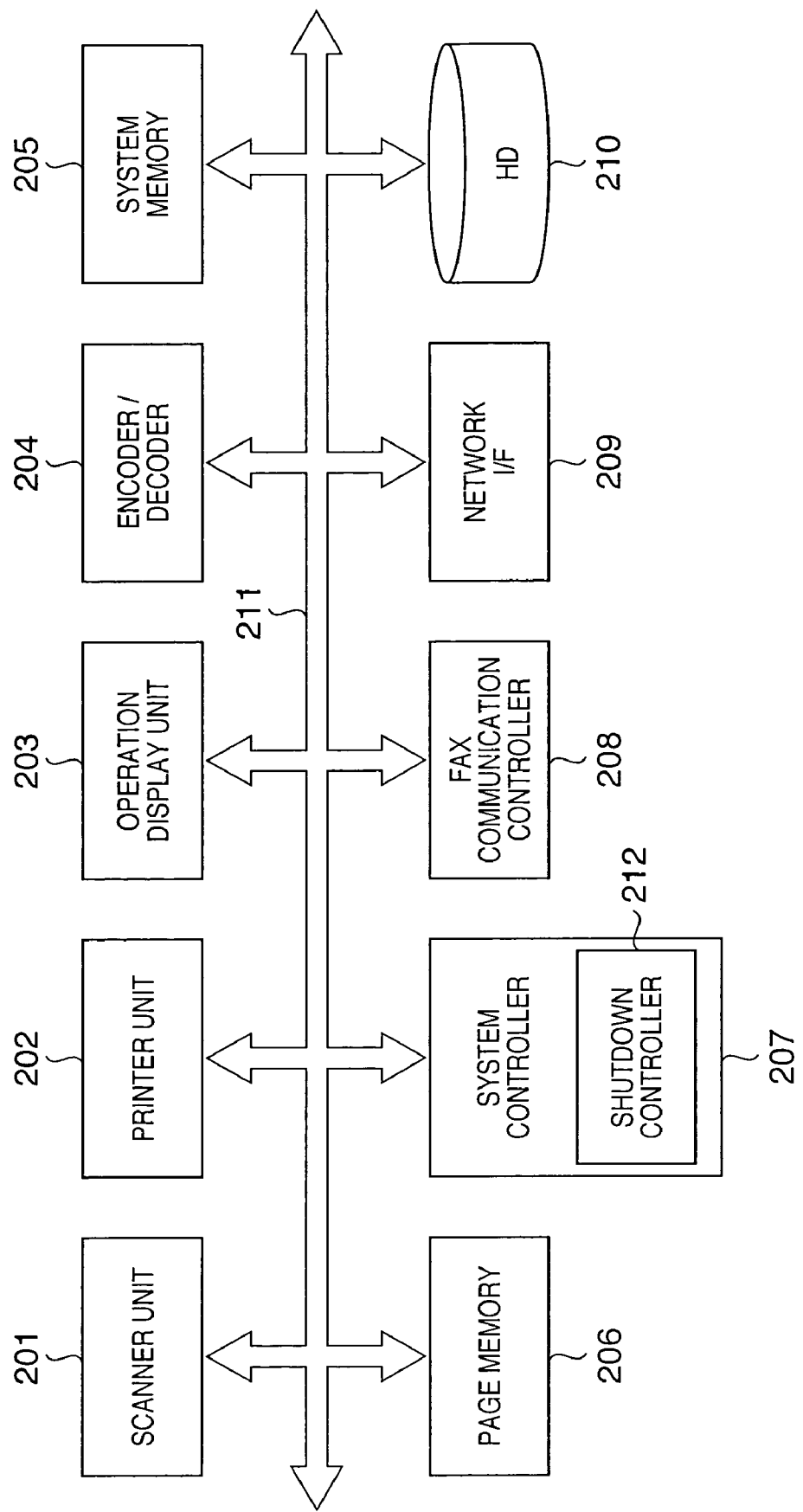
FIG. 2 is a block diagram showing an example of the basic configuration of a digital multifunction peripheral 102.

FIG. 2 is a block diagram showing an example of the basic configuration of the digital MFP 102.

The digital MFP 102 of this embodiment has a scanner unit 201, a printer unit 202, an operation display unit 203, an encoder/decoder 204, a system memory 205, a page memory 206, a system controller 207 including a shutdown controller 212, a FAX communication controller 208, a network I/F 209, a hard disk (HD) 210, and an internal bus 211 which connects these components.

The scanner unit 201 reads an original and forms image data in accordance with the designated mode (e.g., the paper size, resolution, and density).

The printer unit 202 prints out a document (an image) which is designated to be printed, and outputs the document (image) to a paper discharge tray via a paper discharge unit such as a finisher.

The operation display unit 203 has an operation unit by which the user inputs various setting operations, and displays the operating state and the like of the apparatus. As the operation display unit 203, a touch panel type display screen or the like can be applied. It is possible, by this touch panel type screen, to input the designations of, e.g., printing and copying, and display the state of a job held by the MFP 102.

The encoder/decoder 204 compresses, by encoding, image data to be transmitted to the outside from this apparatus, and decodes externally received compressed data to restore the original image data.

The system memory 205 includes a RAM and ROM, and stores information to be preregistered in this apparatus. The system memory 205 also has a work area which is necessary when the system controller 207 performs various processes.

The page memory 206 has an area necessary to perform encoding or decoding and capable of storing image data of one page.

The system controller 207 is a microcomputer including a central processing unit (CPU). The system controller 207 controls the overall apparatus including the individual units forming the MFP 102, and also controls processes (to be described later) to be performed by the MFP 102. The system controller 207 incorporates the shutdown controller 212 which controls a shutdown process (to be described in detail later).

The FAX communication controller 208 is connected to a facsimile line such as a PSTN line, and communicates with other facsimile apparatuses via this PSTN line.

The network I/F 209 functions as an interface which connects the MFP 102 to the network 107. The MFP 102 can perform data communication with external apparatuses via the network I/F 209.

The HD 210 comprises a nonvolatile memory such as a magnetic disk, and stores, in the form of files, document data received from external apparatuses, scanned document data, and the like.

Figure 3:
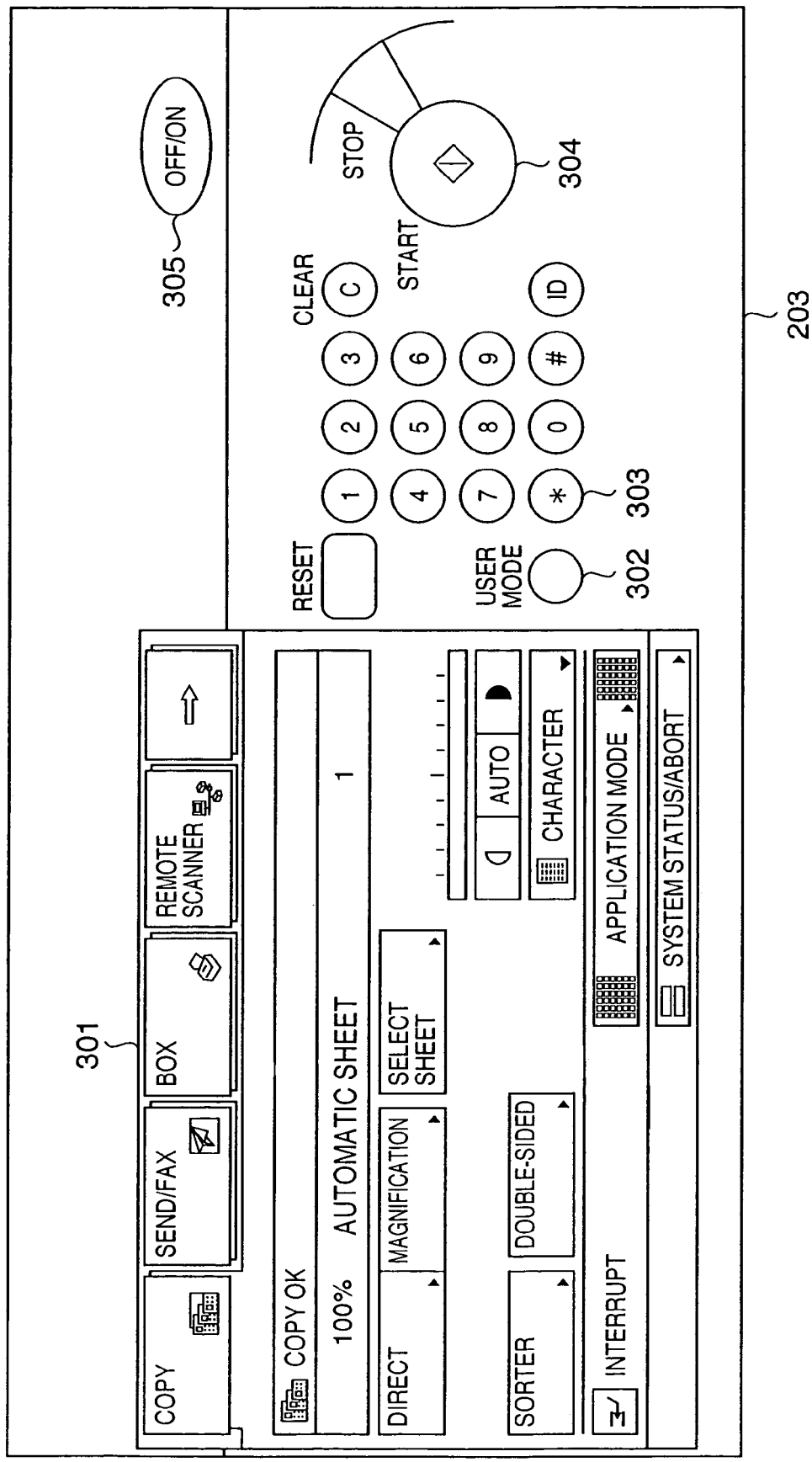
FIG. 3 is a view showing an example of the external appearance of an operation display unit 203.

The operation display unit 203 of the digital MFP 102 of this embodiment will be explained below. FIG. 3 is a view showing an example of the outer appearance of the operation display unit 203. As shown in FIG. 3, the operation display unit 203 has a touch panel type liquid crystal display 301, user mode key 302, ten-key pad 303, start key 304, and operation unit power switch 305. The liquid crystal display 301 displays, e.g., the state of the apparatus and messages to the user, and also displays button images for accepting operation instructions from the user. When the user mode key 302 is pressed, a user mode list is displayed on the liquid crystal display 301. The operation unit power switch 305 does not shut down the main power supply of the digital MFP 102. That is, power is supplied to portions necessary to detect the pressing of the operation unit power switch 305 and detect the reception of an external printing request and the like, and power supply to the rest of the apparatus is shut down. A main power switch (not shown) for shutting down the main power supply of the digital MFP is separately installed. Note that the arrangement of the operation display unit 203 is not limited to this one.

<Display Windows>

Examples of windows displayed on the liquid crystal display 301 in the basic operations of the digital MFP 102 of this embodiment will be described below. Note that the display contents of each window explained below and functions which can be set and executed from the window can be appropriately changed in accordance with the specifications of the apparatus, and details of each function are irrelevant to the spirit and scope of this embodiment, so an explanation thereof will be omitted. Data pertaining to each window explained below is stored in the system memory 205, and the system controller 207 generates and displays a window on the liquid crystal display 301 by using this data. Also, operations related to items displayed on the liquid crystal display 301 can be performed by the buttons described above. When sensing an operation like this, the system controller 207 performs the corresponding process, and changes a window to be displayed on the liquid crystal display 301.

Figure 4:
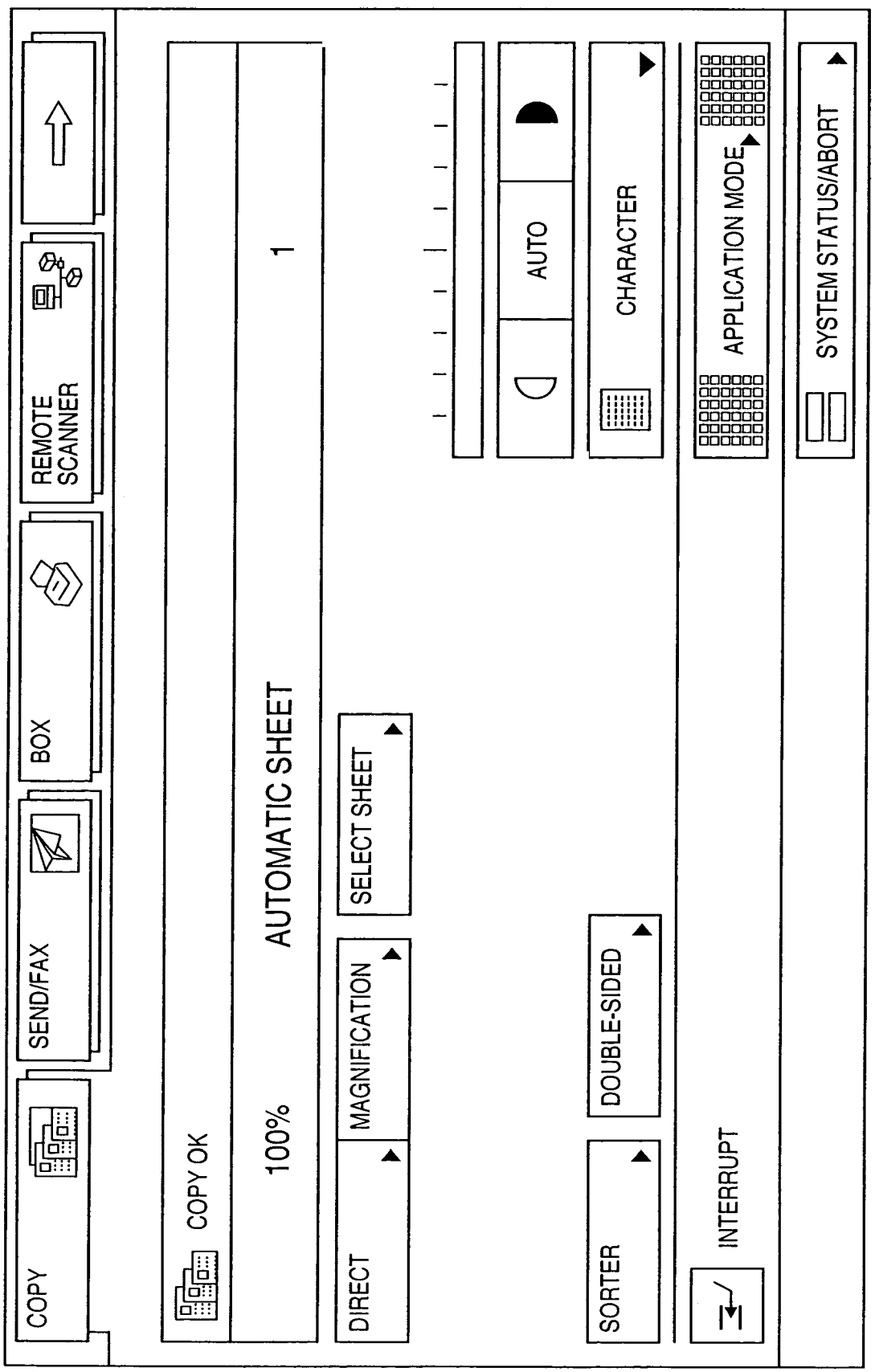
FIG. 4 is a view showing an example of the display of a basic copy window initially displayed when the digital multifunction peripheral 102 is activated.

FIG. 4 is a view showing an example of the display of a basic copy window which is initially displayed when the digital MFP 102 is activated. Note that the window initially displayed upon activation may also be changed by the setting in the user mode. Copying can be executed in this state, and the initial settings (magnification=100%, A4 sheet, copy quantity=1) of copying are displayed in the display window in FIG. 4. The window includes, e.g., "DIRECT" and "MAGNIFICATION" buttons for setting the magnification, a "SHEET" button for setting a sheet to be used, a "SORTER" button for setting the use/nonuse of a sorter, a "DOUBLE-SIDE" button for setting double-side copying, an "APPLICATION MODE" button for setting copying using various additional functions, and a density adjust button. Copying is executed in accordance with settings designated by using these buttons.

Also, the upper portion of this window has four buttons, i.e., "COPY", "SEND/FAX", "BOX", AND "REMOTE SCANNER" buttons representing functions. Of these buttons, a presently effective function is highlighted. When another button is touched, the corresponding function is made effective. The lower portion of the window has an "INTERRUPT" button for setting an interrupt process which interrupts a job currently being executed and executes a new job, and a "SYSTEM STATUS/ABORT" button which is used to, e.g., change, confirm, and abort jobs, and display the log of jobs. This "SYSTEM STATUS/ABORT" button is displayed in all manus.

Figure 5:
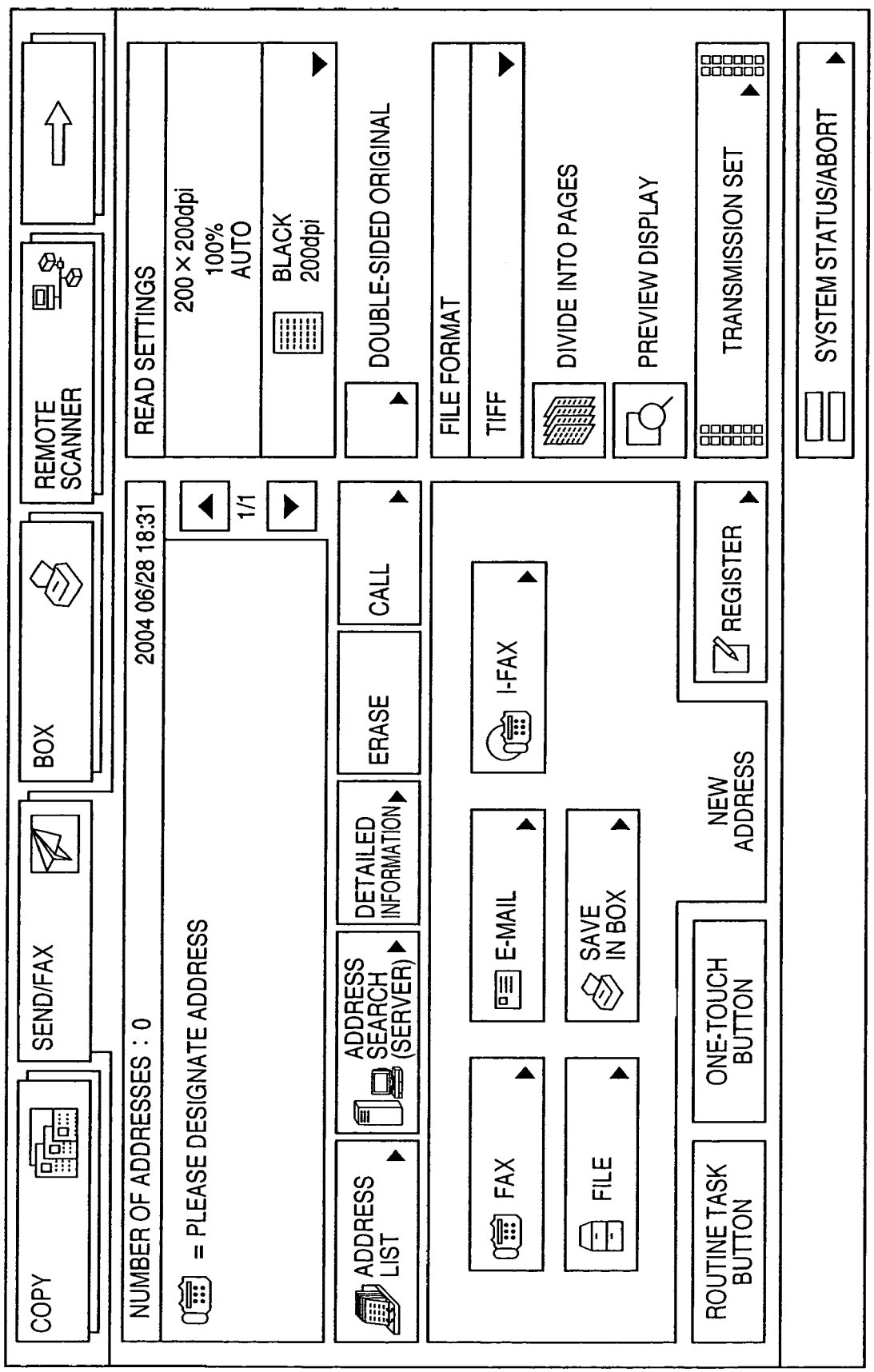
FIG. 5 is a view showing an example of the display of a transmission window which is displayed when a "TRANSMIT/FAX" button is touched in the window shown in FIG. 4.

FIG. 5 is a view showing an example of the display of a transmission window which is displayed when the "SEND/FAX" button is touched in the window shown in FIG. 4.

The transmission window has a display window for displaying a designated address in the upper portion, a window for displaying detailed settings on the right side, a "READ SETTINGS" button for setting original read conditions, a button for designating a double-sided original, and a "FILE FORMAT" button for selecting a file format from a dropdown window. Buttons below the above buttons are a "DIVIDE INTO PAGES" button for setting whether to transmit a plurality of pages of images as different files, and a "PREVIEW DISPLAY" button for displaying a read original as a preview on the liquid crystal display 301. A "TRANSMISSION SETTINGS" button for setting details of transmission is formed below these buttons. Buttons below a window for displaying addresses are, from the left, an "ADDRESS LIST" button for displaying previously input addresses, an "ADDRESS SEARCH" button for searching an address list of an external server, a "DETAIL SETTINGS" button for setting details of addresses, an "ERASE" button for erasing addresses, and a "CALL" button for calling addresses from the past transmission log. Buttons displayed below the above buttons are used to select, from "FAX", "E-MAIL", "IFAX", "FILE", or "SAVE IN BOX", a method of transmitting or storing image data scanned by the scanner unit with respect to a new address. When image data is to be transmitted to an already registered address, the registered addresses are displayed by touching a "ONE-TOUCH BUTTON". When image data is to be transmitted to a registered address by a predetermined method, the set contents such as the registered address and the corresponding transmission method are displayed by touching a "ROUTINE TASK" button.

Figure 6:
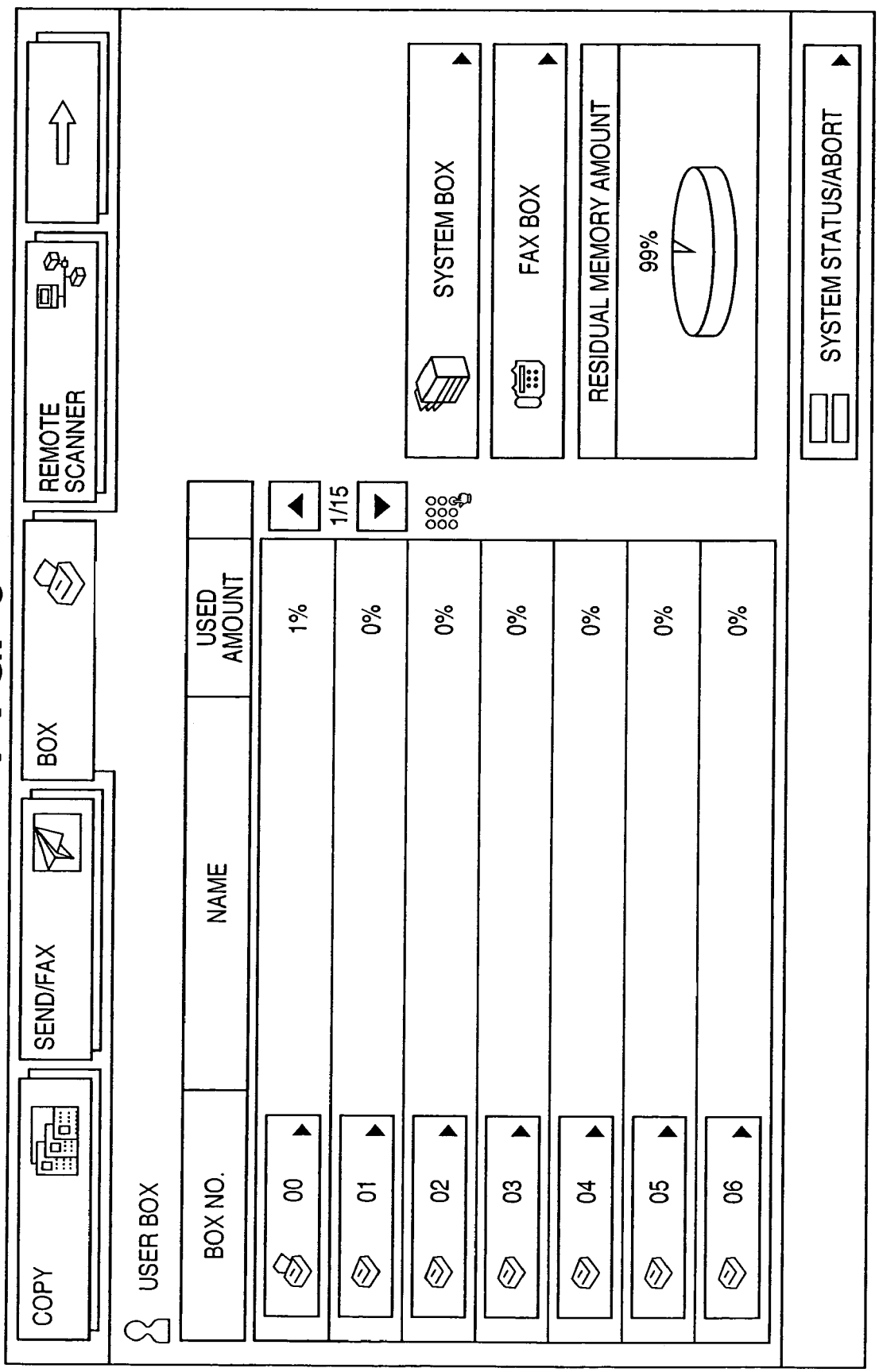
FIG. 6 is a view showing an example of the display of a box selection window which is displayed when a "BOX" button is touched in the window shown in FIG. 4.

FIG. 6 is a view showing an example of the display of a box selection window which is displayed when the "BOX" button is touched in the window shown in FIG. 4. The box function saves image data scanned by the scanner unit or data (a document) transmitted across the network. Referring to FIG. 6, the contents of the user box are displayed for the box number, name, and memory used amount. On the right side of the window, "SYSTEM BOX" and "FAX BOX" buttons are arranged, and the contents of a box corresponding to a touched button are displayed. Also, a usable residual memory amount is displayed in the lower right corner. By performing operations in accordance with the window display as described above, processes such as copying, facsimile transmission/reception, printing, scan, and save are executed.

Figure 7:
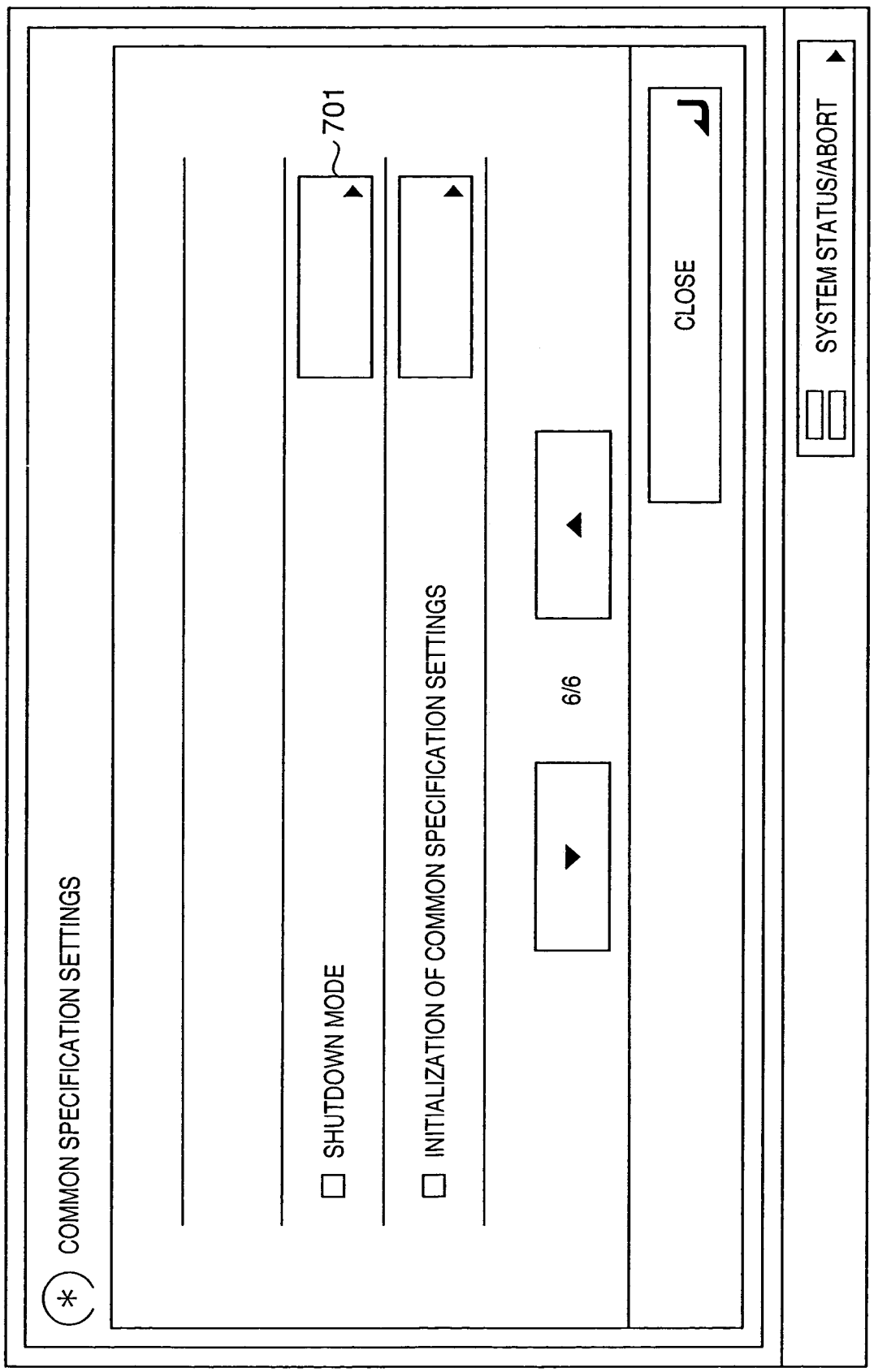
FIG. 7 is a view showing an example of the display of a window for selecting a shutdown mode in a common specification setting window which is displayed when a user mode key 302 of the operation display unit 203 shown in FIG. 3 is pressed.

FIG. 7 is a view showing an example of the display of a window for selecting a shutdown mode in a "COMMON SPECIFICATION SETTING" window which is displayed when the user mode key 302 of the operation display unit 203 shown in FIG. 3 is pressed. The shutdown mode is a mode for performing, e.g., processing necessary to shut down the main power supply of the digital MFP 102, and notification to the user. Details of the shutdown mode will be explained below. The user can enter the shutdown mode by touching a shutdown button image 701. The touch panel type liquid crystal display 301 senses the touch on the shutdown button image 701, and notifies the system controller 207 of the touch. Upon sensing this notification, the system controller 207 advances to the shutdown mode, and executes a control process (to be explained later) pertaining to shutdown.

Note that the operation which the user performs to advance to the shutdown mode is not limited to the above operation, and the following operation may also be performed.

Figure 8:
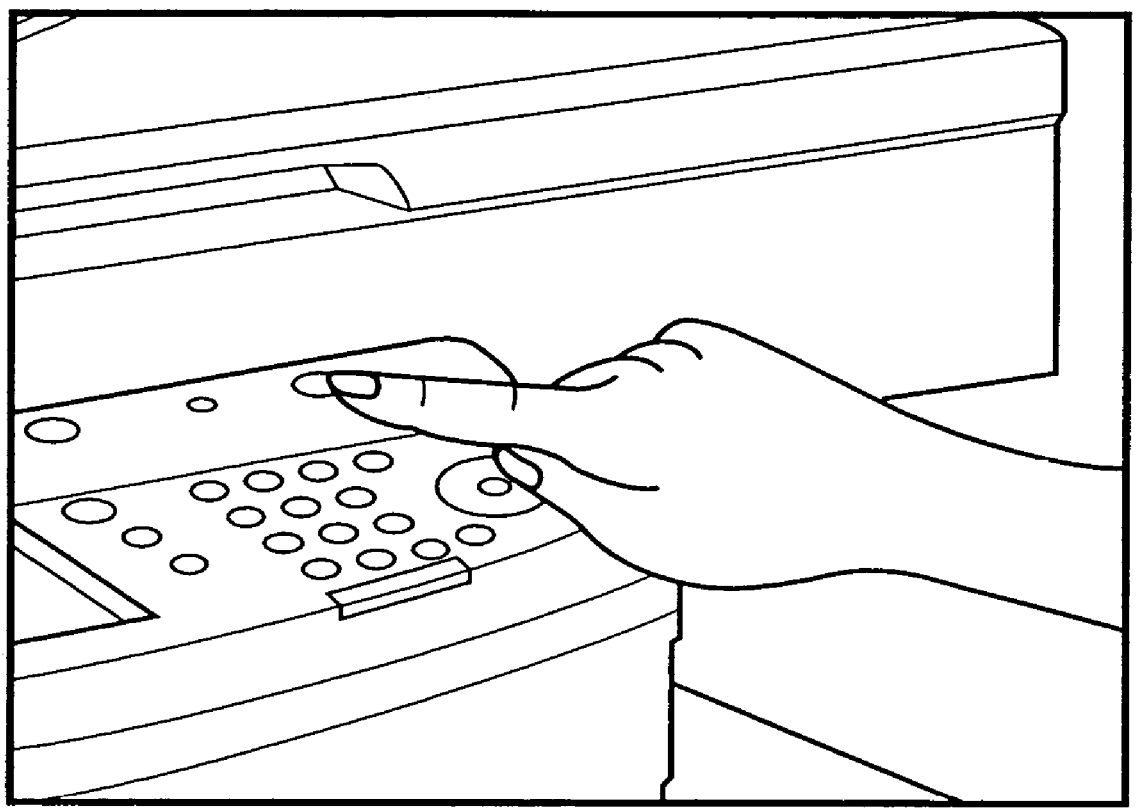
FIG. 8 is a schematic view showing the way the shutdown mode is started by pressing an operation unit power switch 305 of the operation display unit 203 shown in FIG. 3 for a long time.

FIG. 8 is a schematic view showing the way the shutdown mode is started by pressing the operation unit power switch 305 of the operation display unit 302 shown in FIG. 3 for a long time. The system controller 207 measures the time during which the operation unit power switch 305 is pressed. If the measured time has exceeded a predetermined time, the system controller 207 advances to the shutdown mode, and executes the control process pertaining to shutdown.

Accordingly, the user can advance to the shutdown mode by pressing the user mode key 302 to display the window shown in FIG. 7 on the liquid crystal display 301 and touching the shutdown button 701, or by pressing the operation unit power switch 305 for a predetermined time.

If a plurality of types of shutdown modes exist, the long-time pressing of the operation unit power switch 305 functions as a shortcut to the window for displaying, on the liquid crystal display 301, the window shown in FIG. 7 which is displayed when the user mode key 302 is pressed. The windows may also be switched such that the shutdown button image 701 is displayed by long-time pressing.

The user can enter the shutdown mode by performing one of the two different operations described above.

<ON/OFF of Power Supply>

The digital MFP 102 of this embodiment has the two power switches, i.e., the main power switch (not shown) of the apparatus main body, and the operation unit power switch 305 of the display operation unit. To activate the apparatus from the state in which the main power supply is OFF, the user turns on the main power switch. To shut down the main power supply, the user advances to the shutdown mode by pressing the operation unit power switch 305 for a predetermined long time or by operating the user mode key 302 and shutdown button 701 in this order, thereby performing the shutdown process, and then turns off the main power switch. When the main power supply is turned off, the supply of power to the MFP 102 is completely shut down. On the other hand, when the operation unit power switch is pressed for a time period shorter than the predetermined time, the power is supplied to some functions of the digital MFP, and the supply of power to the rest is shut down.

<Shutdown Mode>

As described above, the shutdown mode starts when the operation unit power switch 305 is pressed for a predetermined time, or when the shutdown mode button 701 is touched in the window (shown in FIG. 7) which is displayed when the user mode key 302 of the operation display unit 203 is pressed. When the shutdown mode starts, the system controller 207 first searches for jobs under execution and waiting jobs. If jobs are found, the system controller 207 displays a list of information about the found jobs on the liquid crystal display 301.

The process of searching for jobs under execution and waiting jogs is a well-known technique. For example, the system controller 207 always manages information (job information) about input jobs, and this information contains the state of each job (the job state is always managed, e.g., the job state is "waiting" immediately after a job is input, "under execution" if the waiting job is executed, and "completed" if the execution of the job is completed). Therefore, the system controller 207 can specify each job under execution and each waiting job by referring to job information on all jobs, and can also obtain, from this job information, the job name, the job acceptance date/time, and the like of each specified job.

When searching for jobs under execution and/or waiting jobs, the system controller 207 displays a list of information on these jobs on the liquid crystal display 301. This display can take various forms. In this embodiment, two types of display forms (one will be referred to as a first shutdown confirmation window hereinafter, and the other will be referred to as a second shutdown confirmation window hereinafter) will be explained.

These two types of display forms may also be switched by the user.

First, the first shutdown confirmation window will be described below.

Figure 9:
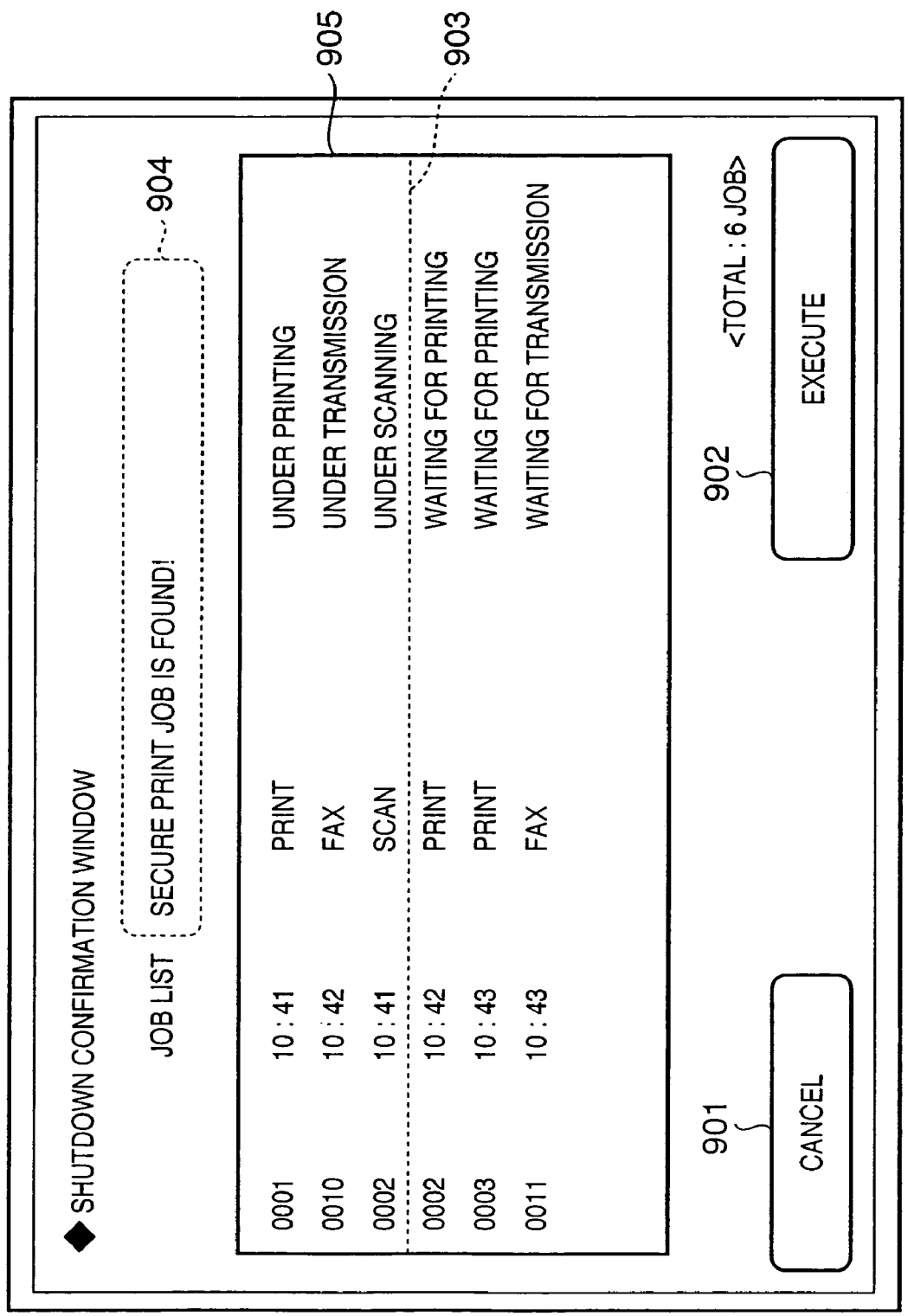
FIG. 9 is a view showing an example of the display of a first shutdown confirmation window.

FIG. 9 is a view showing an example of the display of the first shutdown confirmation window. As shown in FIG. 9, the first shutdown confirmation window takes a display form in which information on jobs under execution and information on waiting jobs are grouped and separately displayed in a display area 905. Referring to FIG. 9, jobs under execution are a job "UNDER PRINTING", a job "UNDER TRANSMISSION", and a job "UNDER SCANNING", and the state (under printing, under transmission, or under scanning), job ID, job generation date/time, and job purpose are displayed for each job. Waiting jobs are a job "WAITING FOR PRINTING" and a job "WAITING FOR TRANSMISSION", and the state (waiting for printing or waiting for transmission), job ID, job generation date/time, and job purpose are displayed for each job.

In FIG. 9, a dotted line 903 separates a display area for the information on jobs under execution and a display area for the information on waiting jobs, in order to visually distinguish between these display areas. Note that the display form for distinguishing between the individual display areas is not limited to this one.

Accordingly, the user can readily identify jobs under execution by monitoring the first shutdown confirmation window as described above.

Also, if a print job (to be referred to as a secure print job hereinafter) which is not executed unless a predetermined operation including the inputting of a password or the like is performed exists among waiting jobs, as indicated in a region 904 of FIG. 9, a message such as "SECURE PRINT JOB IS FOUND!" is displayed in a visually readily understandable manner, e.g., highlighted, thereby provoking a user's attention. Note that the information to be displayed is not limited to information like this. For example, of the information about waiting jobs displayed in the display area 905, information about a job corresponding to a secure print job can be displayed in color different from that of the rest. That is, the display form is not particularly limited.

A secure print job can be found as follows. That is, information on a job contains identification information indicating whether this job is a secure print job or not. Therefore, by referring to this identification information of the information on waiting jobs, a secure print job can be specified from these waiting jobs, and at the same time the existence of the secure print job can be sensed.

Note that the state (under execution or waiting) of each job displayed in the first shutdown confirmation window changes in real time, so this display is also updated in real time. Completely executed jobs are, of course, erased from the display.

If the user touches a cancel button 901, a normal operation mode (a mode before the shutdown mode is started) returns from the shutdown mode, and the corresponding window is displayed. If the user touches an execute button 902, a series of processes pertaining to shutdown (to be explained later) are executed.

The second shutdown confirmation window will be described below.

Figure 10:
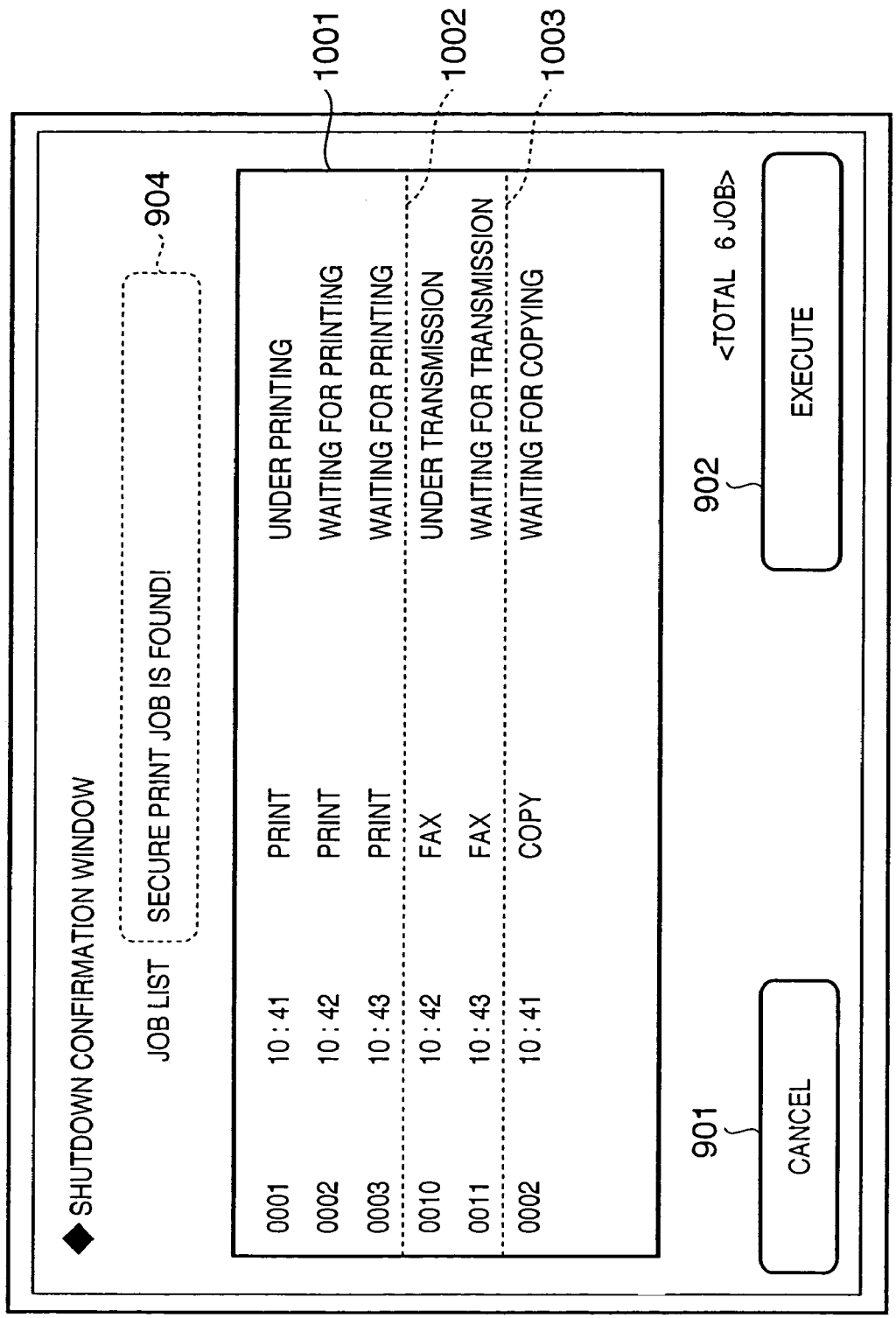
FIG. 10 is a view showing an example of the display of a second shutdown confirmation window.

FIG. 10 is a view showing an example of the display of the second shutdown confirmation window. The same reference numerals as in FIG. 9 denote the same parts in FIG. 10, and an explanation thereof will be omitted.

As shown in FIG. 10, the second shutdown confirmation window is the same as the first shutdown confirmation window except for the display form of a display area 1001. Therefore, the display in the display area 1001 will be explained below.

Similar to the first shutdown confirmation window, items displayed in the display area 1001 are information on jobs under execution and information on waiting jobs. In the second shutdown confirmation window, however, the individual jobs are displayed as they are classified in accordance with the contents of operations. Referring to FIG. 10, pieces of information on jobs are displayed as they are classified into three types, i.e., jobs for printing, jobs for transmitting/receiving data by using a facsimile function, and jobs for copying. That is, the individual jobs are grouped into these three types, and the information on jobs is displayed for each group. In each group, jobs under execution and waiting jobs are separately displayed although these jobs perform the same operation.

In FIG. 10, to visually distinguish between the display areas of the individual groups, dotted lines 1002 and 1003 separate these display areas. Note that the display form for distinguishing between the individual display areas is not limited to this one.

Since the state (under execution or waiting) of each job displayed in the second shutdown confirmation window changes in real time, the display is also updated in real time. Completely executed jobs are, of course, erased from the display.

Figure 13:
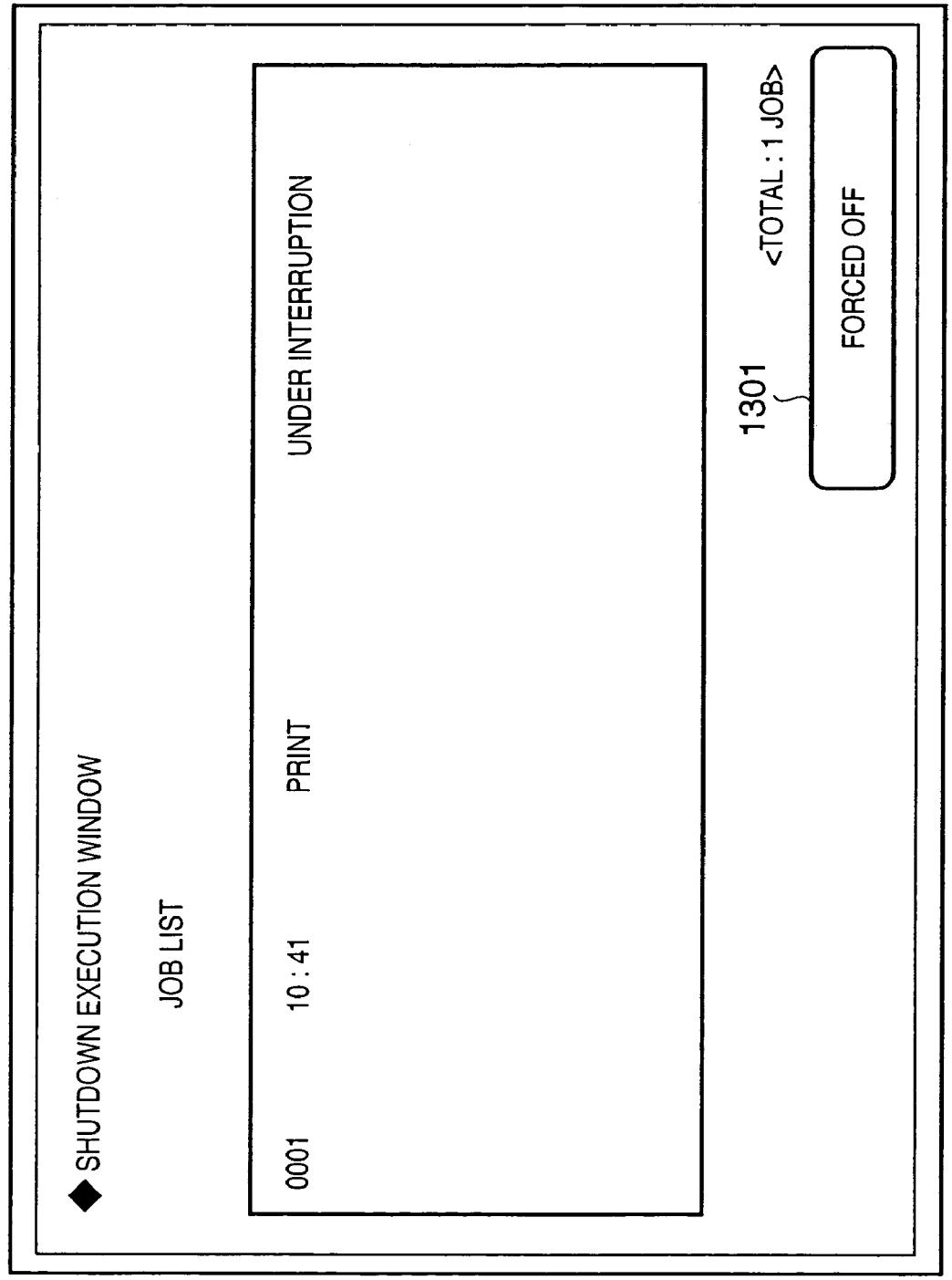
FIG. 13 is a view showing an example of the display of a shutdown execution window.

If there are neither jobs under execution nor waiting jobs when the shutdown mode starts, the display of these shutdown confirmation windows is skipped, a shutdown execution window shown in FIG. 13 is displayed, and a shutdown process is performed. If there are neither jobs under execution nor waiting jobs when the shutdown mode starts, it is also possible to display a shutdown confirmation window which notifies the user that neither jobs under execution nor waiting jobs exist, display the shutdown execution window shown in FIG. 13, and perform the shutdown process.

Note that the user may also set one of these courses in which the shutdown process is performed, if there are neither jobs under execution nor waiting jobs when the shutdown mode starts.

Figure 11:
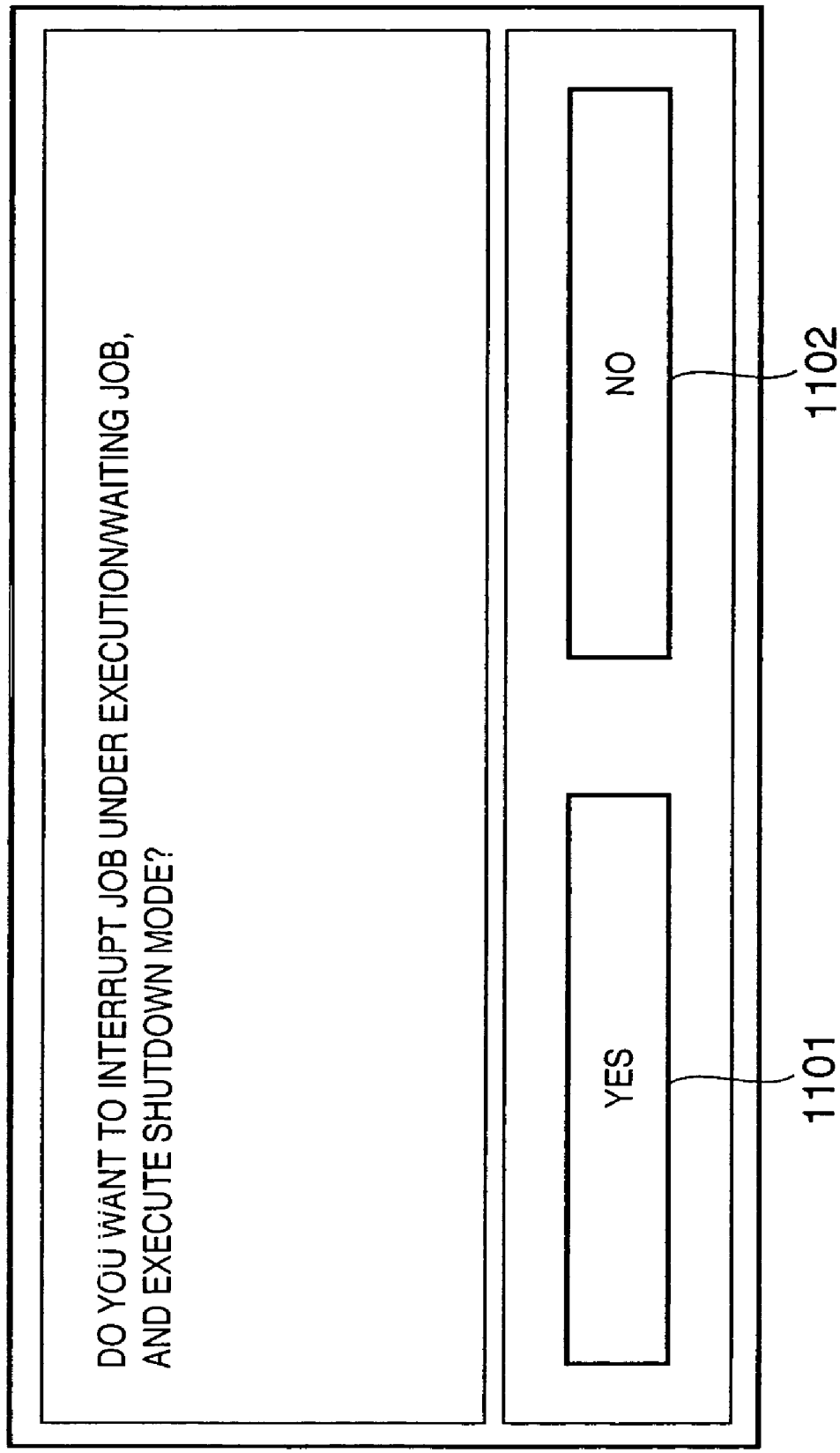
FIG. 11 is a view showing an example of the display of a window (a confirmation window) for reconfirming, when the user designates shutdown by touching a button image 902 in the shutdown confirmation window, whether to interrupt and erase a job under execution and erase a waiting job before the shutdown process is performed.

FIG. 11 is a view showing an example of the display of a window (a confirmation window) for reconfirming whether to perform the shutdown process by interrupting and erasing jobs under execution and erasing waiting jobs, if the user designates shutdown by touching the button 902 in the shutdown confirmation window (in this embodiment, the first or second shutdown confirmation window).

In the window shown in FIG. 11, if the user touches a button 1101, the shutdown execution window shown in FIG. 13 is displayed, jobs under execution are interrupted, data related to the jobs is erased from the HD 210, data related to waiting jobs is erased from the HD 210, and the shutdown process is started. If the user touches a button 1102, the shutdown confirmation window displayed previously is displayed on the liquid crystal display 301. The window shown in FIG. 11 may also be displayed as a popup window in (front of) the shutdown confirmation window.

Figure 12:
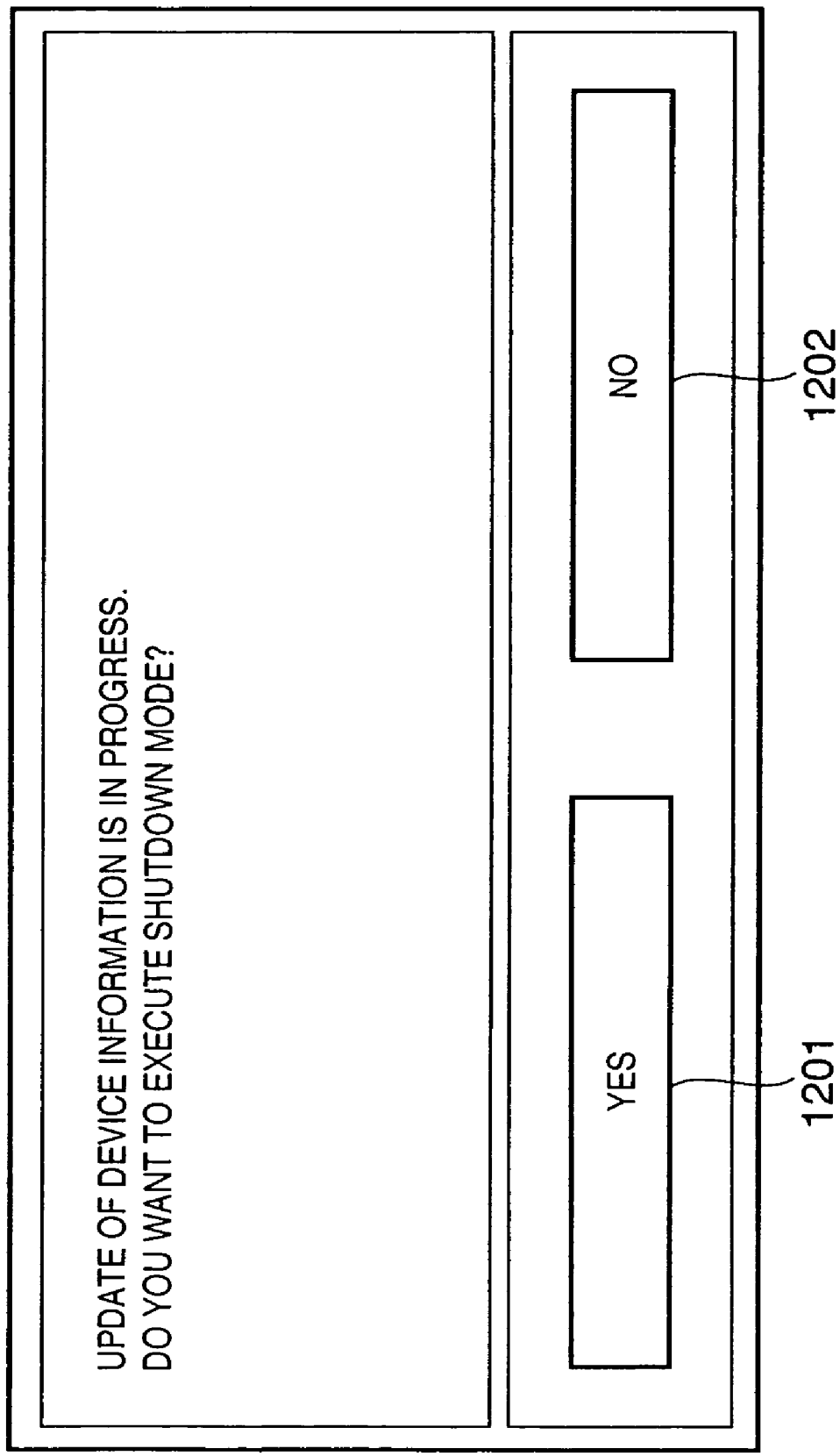
FIG. 12 is a view showing an example of the display of a window (a confirmation window) displayed on a liquid crystal display 301 to allow the user to determine whether to perform shutdown, if an apparatus information updating process is being performed regardless of a job under execution and a waiting job when the user designates shutdown by touching the button image 902 in the shutdown confirmation window.

FIG. 12 is a view showing an example of the display of a window (a confirmation window) which is displayed on the liquid crystal display 301 in order to allow the user to select whether to perform shutdown, if a process of updating apparatus information is running regardless of jobs under execution and waiting jobs when the user designates shutdown by touching the button image 902 in the shutdown window (in this embodiment, the first or second shutdown confirmation window). An example of the process of updating apparatus information is a process of updating font data of the apparatus by externally downloading font data and writing it in the HD 210. Other examples are a process of updating system data such as set parameters of the apparatus by externally downloading system data, and a process of transmitting the system data of the apparatus to the outside. Still another example of the apparatus information updating process is a process of externally receiving firmware or an application program to be executed by the apparatus, and writing the firmware or program in the HD.

If the user touches a button image 1201 in the window shown in FIG. 12, the shutdown execution window shown in FIG. 13 is displayed, and the shutdown process is started. In this case, the apparatus information updating process described above is performed in parallel with this shutdown process. If the user touches a button image 1202, the liquid crystal display 301 displays the shutdown confirmation window which is displayed previously. The window shown in FIG. 12 may also be displayed as a popup window in (front of) the shutdown confirmation window.

FIG. 13 is a view showing an example of the display of the shutdown execution window. This window shown in FIG. 13 is displayed on the liquid crystal display 301 until the shutdown process is completed. As described above, the processes performed in this shutdown process are the process of interrupting and erasing a job under execution, the process of erasing a waiting job, and the process of inhibiting transition to execution of a waiting job to be saved after shutdown. During this process, as shown in FIG. 13, "UNDER INTERRUPTION" is displayed as the state of each job, and the display of an erased jog disappears from this window. In addition to the above processes pertaining to jobs, a software termination process including a font download process and system data download process is performed. Furthermore, a process of terminating hardware such as the printer, scanner, and facsimile device is performed. As described earlier, the system controller 207 performs these series of processes.

When the processes of erasing and updating all jobs are completed, it is determined that shutdown is completed, and the shutdown execution window changes to a shutdown completion window (to be described later).

Also, as shown in FIG. 13, the shutdown execution window includes a forced OFF button 1301 which immediately terminates shutdown by skipping the job erasing process, job updating process, software termination process, and hardware termination process currently being performed. The user can immediately display the shutdown completion window by touching the forced OFF button 1301. Since in this case the job erasing process is skipped, no such control as the formation of the job log, which is controlled in the normal termination sequence, is performed.

Figure 14:
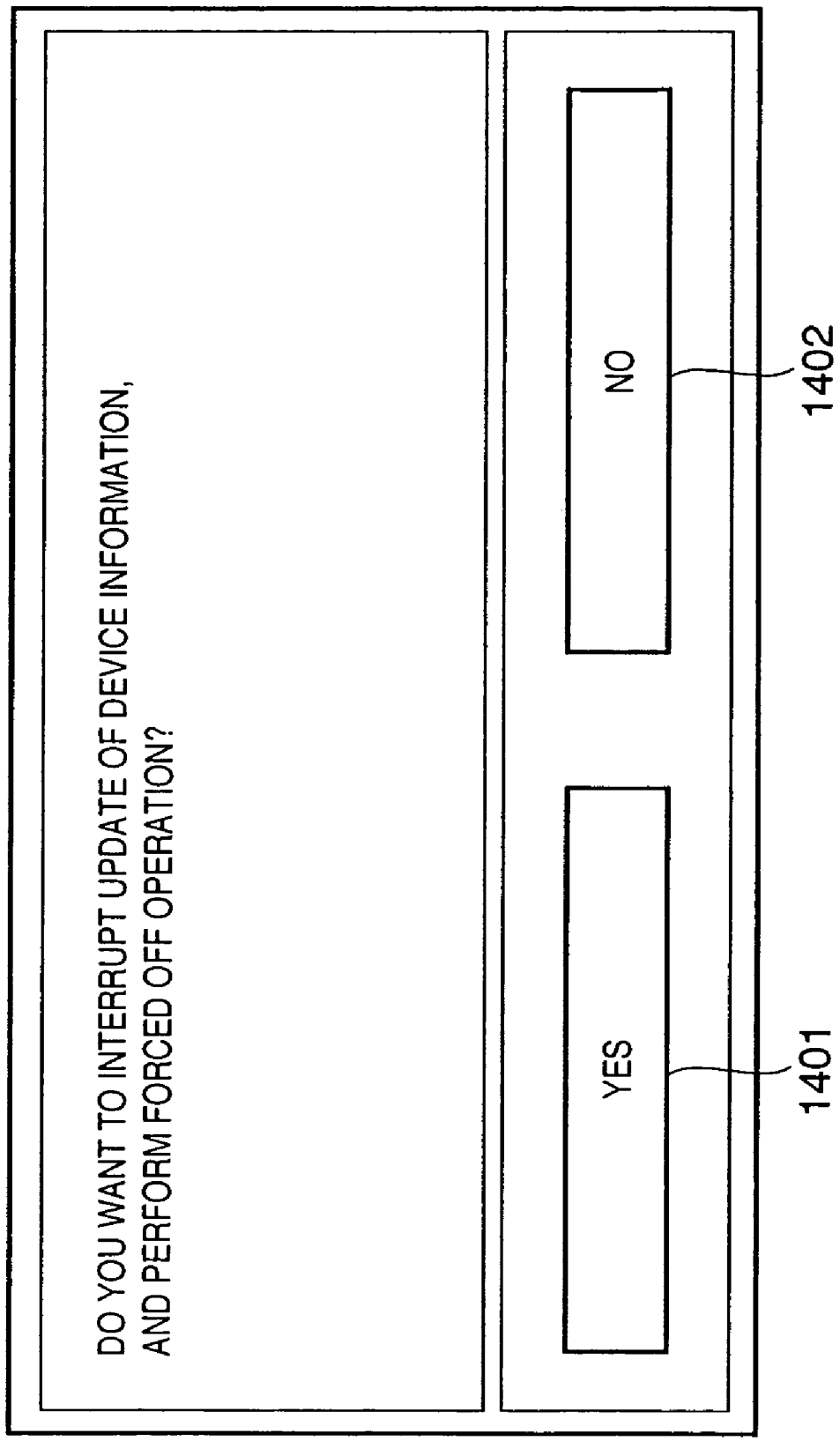
FIG. 14 is a view showing an example of the display of a window (a confirmation window) displayed on the liquid crystal display 301, if the apparatus information updating process is being performed when a forced OFF key 1301 in the shutdown execution window shown in FIG. 13 is touched, in order to allow the user to determine whether to interrupt this updating process and immediately perform shutdown.

FIG. 14 is a view showing an example of the display of a window which is displayed on the liquid crystal display 301 in order to allow the user to select, if the apparatus information updating process is being executed when the forced OFF button 1301 in the shutdown execution window shown in FIG. 13 is touched, whether to immediately perform shutdown by interrupting the updating process.

If the user touches a button image 1401 in the window shown in FIG. 14, the updating process is interrupted, and the shutdown process is immediately performed. If the user touches a button image 1402, the updating process is continued, and the liquid crystal display 301 displays the shutdown confirmation window which is displayed previously. The window shown in FIG. 14 may also be displayed as a popup window on (front of) the shutdown confirmation window.

FIG. 15 is a view showing an example of the display of a window which is displayed when the shutdown process is completed. When this window is displayed, the shutdown controller 212 inhibits access to the network 107, inhibits access to the HD 210, and halts all software. After confirming that this shutdown completion window is displayed, the user can turn off the main power supply by operating the main power switch (not shown).

It is also possible to synchronize the shutdown completion window and main power supply, and turn off the main power supply instead of displaying the shutdown completion window.

<Processes of Displaying First Shutdown Confirmation Window>

Figure 16A:
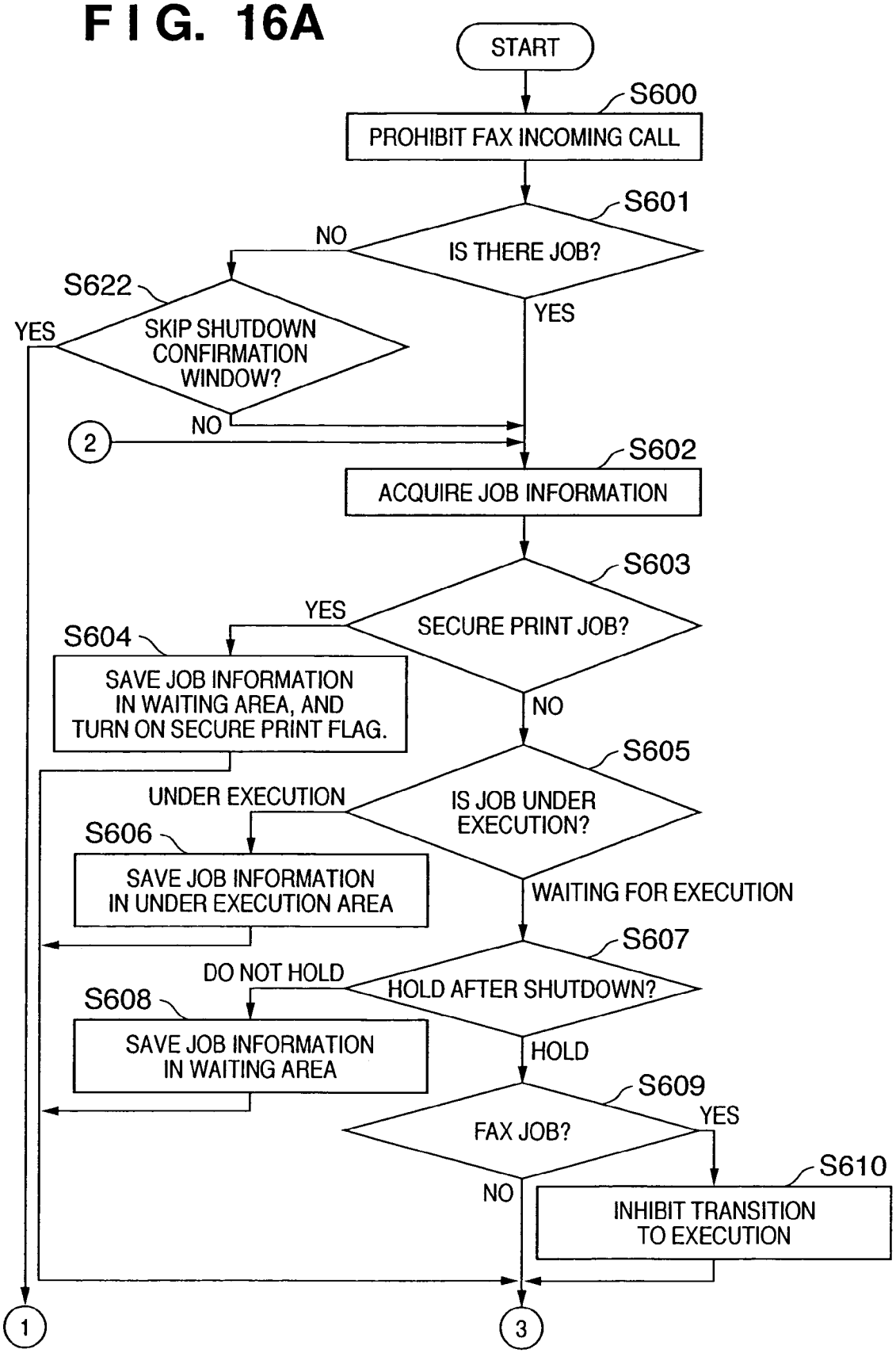

A series of processes of displaying the first shutdown confirmation window and advancing to the shutdown execution window will be explained below with reference to FIGS. 16A and 16B showing the flowchart of the processes. Note that programs and data for allowing the system controller 207 (including the shutdown controller 212) to execute the processes following the flowchart shown in FIGS. 16A and 16B are stored in the system memory 205, and the system controller 207 performs the processes explained below by using these programs and data.

When the shutdown mode is started by the user's operation as described above, a process in step S600 is performed first. In step S600, if the FAX communication controller 208 has an incoming call for facsimile reception, the shutdown controller 212 of the system controller 207 ignores this incoming call, and limits the facsimile receiving operation. On the basis of this limitation, the partner apparatus determines that the receiver does not respond, and advances to an operation such as redialing. After this facsimile reception limitation, the flow advances to step S601.

In step S601, whether there are jobs under execution and waiting jobs is determined by referring to the system memory 205 which holds information on jobs. If there are jobs under execution and waiting jobs, the flow advances to step S602.

In step S602, from a group of the jobs under execution and waiting jobs, pieces of information on these jobs are read out and acquired one after another, and the flow advances to step S603. In step S603, on the basis of each acquired job information, whether the job is a storage type job such as a secure print job is determined. If the job is a storage type job, the flow advances to step S604.

In step S604, the acquired job information (the information on a storage type job) is stored together with a flag (a secure print flag) which indicates that this job information is a storage type job, while the flag is turned on (e.g., the value is 1). The storage destination is a "waiting job save area" in the system memory 205.

The flow then advances to step S611 to determine whether information on all held jobs is acquired. If there is unacquired job information, the flow returns to step S602 to repeat the process therefrom.

On the other hand, if it is determined in the process in step S603 that the information acquired in step S602 does not belong to any storage type job, the flow advances to step S605 to determine whether this job is under execution by referring to the information acquired in step S602. If the job is under execution, the flow advances to step S606 to store the acquired job information (the information on not a storage type job but a job under execution) in a "job under execution save area" in the system memory 205.

The flow then advances to step S611 to determine whether information on all held jobs is acquired. If there is unacquired job information, the flow returns to step S602 to repeat the process therefrom.

If it is determined in the process in step S605 that the information acquired in step S602 does not belong to any job under execution, the flow advances to step S607. In step S607, it is determined by referring to the information acquired in step S602 whether the job is a job (called a "shutdown holding job") which is to be held in the system memory 205 even after the power supply of the apparatus is shut down. Examples of a job like this are a facsimile transmission job for which a timer has been set at the transmission time, and a job which is executed when the power supply of the apparatus is activated again after being shut down. Note that whether to set a job as a shutdown holding job can be set by the user before the job is input to the apparatus.

If the job is not a shutdown holding job but a job which is to be erased (canceled) during the course of the shutdown process, the flow advances to step S608. In step S608, the acquired job information (the information on not a storage type job but a shutdown holding job) is stored in the "waiting job save area" in the system memory 205.

The flow then advances to step S611 to determine whether information on all held jobs is acquired. If there is unacquired job information, the flow returns to step S602 to repeat the process therefrom.

If it is determined in the process in step S607 that the information acquired in step S602 is a shutdown holding job, the flow advances to step S609. If in step S609 it is determined by referring to the information acquired in step S602 that the job is a facsimile job, the flow advances to step S610 to inhibit the transition to execution of this waiting facsimile job. Since the transition to execution of the job is inhibited, no transmission operation is performed even when the waiting job becomes transmittable after the communication of another facsimile job under execution is completed. The flow then advances to step S611 to determine whether information on all held jobs is acquired. If there is unacquired job information, the flow returns to step S602 to repeat the process therefrom.

If information on all held jobs is acquired and the processes in steps S602 to S610 are performed, the flow advances from step S611 to step S612, and the system controller 207 displays the shutdown confirmation window shown in FIG. 9 on the liquid crystal display 301. For this display, the system controller 207 first reads out the pieces of information stored in the job under execution area in step S606, and displays, on the liquid crystal display 301, only information to be displayed as "information on jobs under execution". After that, the system controller 207 reads out the pieces of information stored in the waiting job area in step S608, and displays only information to be displayed as "information on waiting jobs" in a display area below the "information on jobs under execution". Note that the relative positional relationship between the display area of the "information on waiting jobs" and the display area of the "information on jobs under execution" is not limited to this one. That is, this relationship is not particularly limited as long as the individual display areas can be visually distinguished from each other.

Also, the system controller 207 refers to the information stored in the job under execution area, and performs the next processing if there is information stored together with an ON secure print flag. That is, information indicating the existence of the secure print flag is conspicuously displayed, e.g., highlighted, in an area different from the "information on jobs under execution" and "information on waiting jobs" displayed previously.

In step S612, therefore, the system controller 207 displays the shutdown confirmation window shown in FIG. 9 on the liquid crystal display 301. After that, the flow advances to step S613.

Note that the following processing may also be performed if there are no jobs to be displayed any longer because, e.g., all jobs under execution are completed while the shutdown confirmation window shown in FIG. 9 is displayed on the liquid crystal display 301 in step S612. That is, since in this case it is unnecessary to notify the user that the power supply is to be shut down, the shutdown confirmation window may also be automatically switched to the shutdown execution window, or to the shutdown completion window shown in FIG. 15.

In step S613, the system controller 207 waits for an input from the user to determine whether to continue the shutdown operation or to leave the shutdown operation and return to the normal display. After the input from the user is received, the flow advances to step S614.

If cancellation is input (if a touch on the cancel button 901 is sensed) in step S614, the flow advances to step S615. In step S615, the facsimile reception (incoming call) limitation in step S600 is canceled, and the FAX communication controller 208 accepts facsimile incoming calls. Also, the inhibition of transition to execution of the facsimile job which is waiting in step S610 is canceled, so the transition to execution of this waiting job is permitted. After the above canceling operations are performed, the normal display is restored. The normal display herein mentioned may be the display immediately before the shutdown operation, or a certain specific initial display.

On the other hand, if the continuation of the shutdown operation is input (if a touch on the execute button 902 is sensed), the flow advances to step S616. In step S616, the system controller 207 reads out the job under execution information and waiting job information stored in the "job under execution save area" and "waiting job save area", respectively, of the system memory 205. If there is job information to be read out (e.g., if there is a job under execution or a waiting job), the flow advances to step S617; if not, the flow advances to step S619.

In step S617, a message such as "DO YOU WANT TO INTERRUPT JOB UNDER EXECUTION OR WAITING JOB, AND EXECUTE SHUTDOWN PROCESS?" as shown in FIG. 11 is displayed on the liquid crystal display 301. This message may also be displayed as a popup window over the whole of the shutdown confirmation window. After the message is displayed, the flow advances to step S618.

If the user enters "YES" to the confirmation message displayed in step S617 (if a touch on the button 1101 is sensed) in step S618, the flow advances to step S619. If the user enters "NO" (if a touch on the button 1102 is sensed) in step S618, the flow returns to step S612.

In step S619, the shutdown controller 212 checks whether software other than jobs is running. If software is running, the flow advances to step S620. If no software is running, the window display is switched from the shutdown confirmation window to the shutdown execution window as shown in FIG. 13.

In step S620, a message such as "UPDATE OF DEVICE INFORMATION IS IN PROGRESS. DO YOU WANT TO EXECUTE SHUTDOWN MODE?" as shown in FIG. 12 is displayed on the liquid crystal display 301. This message may also be displayed as a popup window over the whole of the shutdown confirmation window. After the message is displayed, the flow advances to step S621.

If the user enters "NO" to the confirmation message displayed in step S620 (if a touch on the button 1202 is sensed) in step S621, the flow returns to step S613. If the user enters "YES" (if a touch on the button 1201 is sensed) in step S621, the window display is switched from the shutdown confirmation window to the shutdown execution window as shown in FIG. 13.

On the other hand, if there is neither a job under execution nor a waiting job in the process in step S601, the flow advances to step S622. If in step S622 it is sensed that the user enters an instruction not to skip the shutdown confirmation window, the flow returns to step S602, and the processes from step S602 are performed. If it is sensed that the user enters an instruction to skip the shutdown confirmation window, the window display is switched from the shutdown confirmation window to the shutdown execution window as displayed in FIG. 13.

<Process of Displaying Second Shutdown Confirmation Window>

Figure 17A:
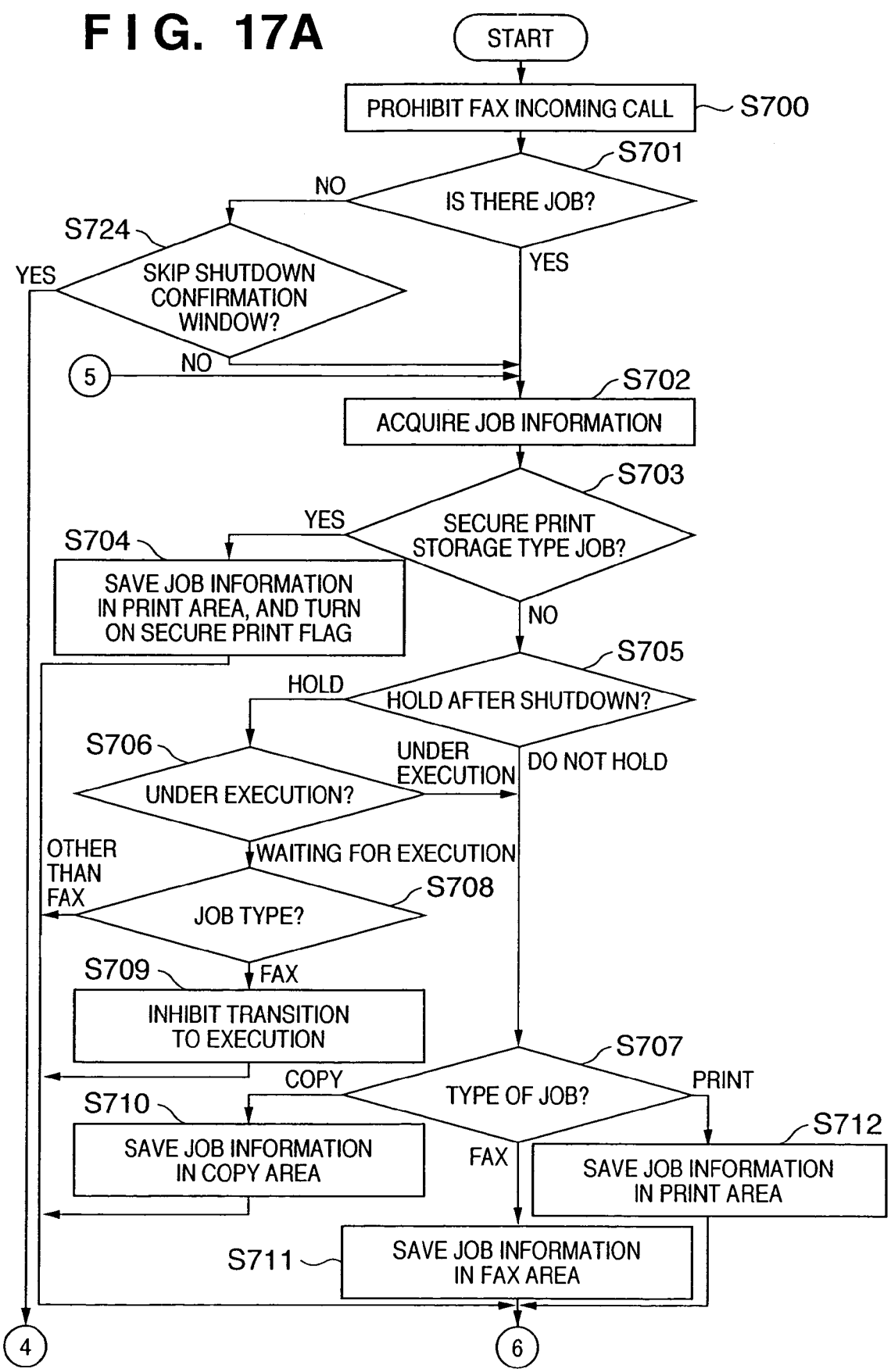

A series of processes of displaying the second shutdown confirmation window and advancing to the shutdown execution window will be explained below with reference to FIGS. 17A and 17B showing the flowchart of the processes. Note that programs and data for allowing the system controller 207 (including the shutdown controller 212) to execute the processes following the flowchart shown in FIGS. 17A and 17B are stored in the system memory 205, and the system controller 207 performs the processes explained below by using these programs and data.

When the shutdown mode is started by the user's operation as described above, a process in step S700 is performed first. In step S700, if the FAX communication controller 208 has an incoming call for facsimile reception, the shutdown controller 212 of the system controller 207 ignores this incoming call, and limits the facsimile receiving operation. On the basis of this limitation, the sender facsimile apparatus determines that the receiver does not respond, and advances to an operation such as redialing. After this facsimile reception limitation, the flow advances to step S701.

In step S701, whether there are jobs under execution and waiting jobs is determined by referring to the system memory 205 which holds information on jobs. If there are jobs under execution and waiting jobs, the flow advances to step S702.

In step S702, the same processing as in step S602 is performed. That is, from a group of the jobs under execution and waiting jobs, information on these jobs are read out and acquired one after another, and the flow advances to step S703. In step S703, the same processing as in step S603 is performed. That is, on the basis of each acquired job information, whether the job is a storage type job such as a secure print job is determined. If the job is a storage type job, the flow advances to step S704.

The acquired information (the information on a storage type job) is a job for performing printing. In step S704, therefore, this job information is stored in an area (print area) of the system memory 205, which stores only jobs for performing printing. In addition, a flag (a secure print flag) which indicates that this job information is a storage type job is attached to this stored information, while the flag is turned on (e.g., the value is 1).

The flow then advances to step S713 to determine whether information on all held jobs is acquired. If there is unacquired job information, the flow returns to step S702 to repeat the process therefrom.

On the other hand, if it is determined in the process in step S703 that the information acquired in step S702 does not belong to any storage type job, the flow advances to step S705 to determine whether this job is a shutdown holding jog by referring to the information acquired in step S702. If the job is a shutdown holding job, the flow advances to step S706 to determine whether this job is under execution. If the job is under execution, the flow advances to step S707. If the job is not under execution, the flow advances to step S708.

If it is determined in step S708 that the job is a facsimile job, the flow advances to step S709 to inhibit the transition to execution of this waiting facsimile job. After that, the flow advances to step S713. Since the transition to execution of the job is inhibited, no transmission operation is performed even when the waiting job becomes transmittable after the communication of another facsimile job under execution is completed. If the job is not a facsimile job, the flow advances to step S713.

On the other hand, if it is determined in step S705 that the information acquired in step S702 does not belong to any shutdown holding job, the flow advances to step S707 to determine the type of the job by referring to the job information.

If this job is a job for performing copying, the flow advances to step S710. In step S710, the job information acquired in step S702 is stored in a "COPY area" of the system memory 205, which stores only jobs for performing copying.

If this job is a job for performing an operation using the facsimile function, the flow advances to step S711. In step S711, the job information acquired in step S702 is stored in a "FAX area" of the system memory 205, which stores only jobs for performing operations using the facsimile function.

If this job is a job for performing printing, the flow advances to step S712. In step S712, the job information acquired in step S702 is stored in the above-mentioned "print area" of the system memory 205, which stores only jobs for performing printing.

The flow then advances to step S713 to determine whether information on all held jobs is acquired. If there is unacquired job information, the flow returns to step S702 to repeat the process therefrom.

If information on all held jobs is acquired and the processes in steps S702 to S712 are performed, the flow advances from step S713 to step S714, and the system controller 207 displays the window shown in FIG. 10 on the liquid crystal display 301. For this display, the system controller 207 first reads out the pieces of information stored in the print area in step S712, and displays, on the liquid crystal display 301, only information to be displayed as "information on print jobs". After that, the system controller 207 reads out the pieces of information stored in the FAX area in step S711, and displays only information to be displayed as "information on facsimile jobs" in a display area below the "information on pint jobs". Furthermore, the system controller 207 reads out the pieces of information stored in the COPY area in step S710, and displays only information to be displayed as "information on copy jobs" in a display area below the "information on facsimile jobs".

Note that the relative positional relationship between the individual display areas is not limited to this one. That is, this relationship is not particularly limited as long as the individual display areas can be visually distinguished from each other.

Also, the system controller 207 refers to the information stored in the print area. If there is information stored together with an ON secure print flag, information indicating the existence of the secure print flag is conspicuously displayed, e.g., highlighted, in an area different from the pieces of information displayed previously.

On the other hand, if there is neither a job under execution nor a waiting job in the process in step S701, the same process as in step S622 explained earlier is performed in step S724. In addition, steps S715 to S723 from the display of the shutdown conformation window to the transition to the shutdown execution window are the same as steps S613 to S621, so an explanation thereof will be omitted.

<Process of Displaying Shutdown Execution Window>

Figure 18:
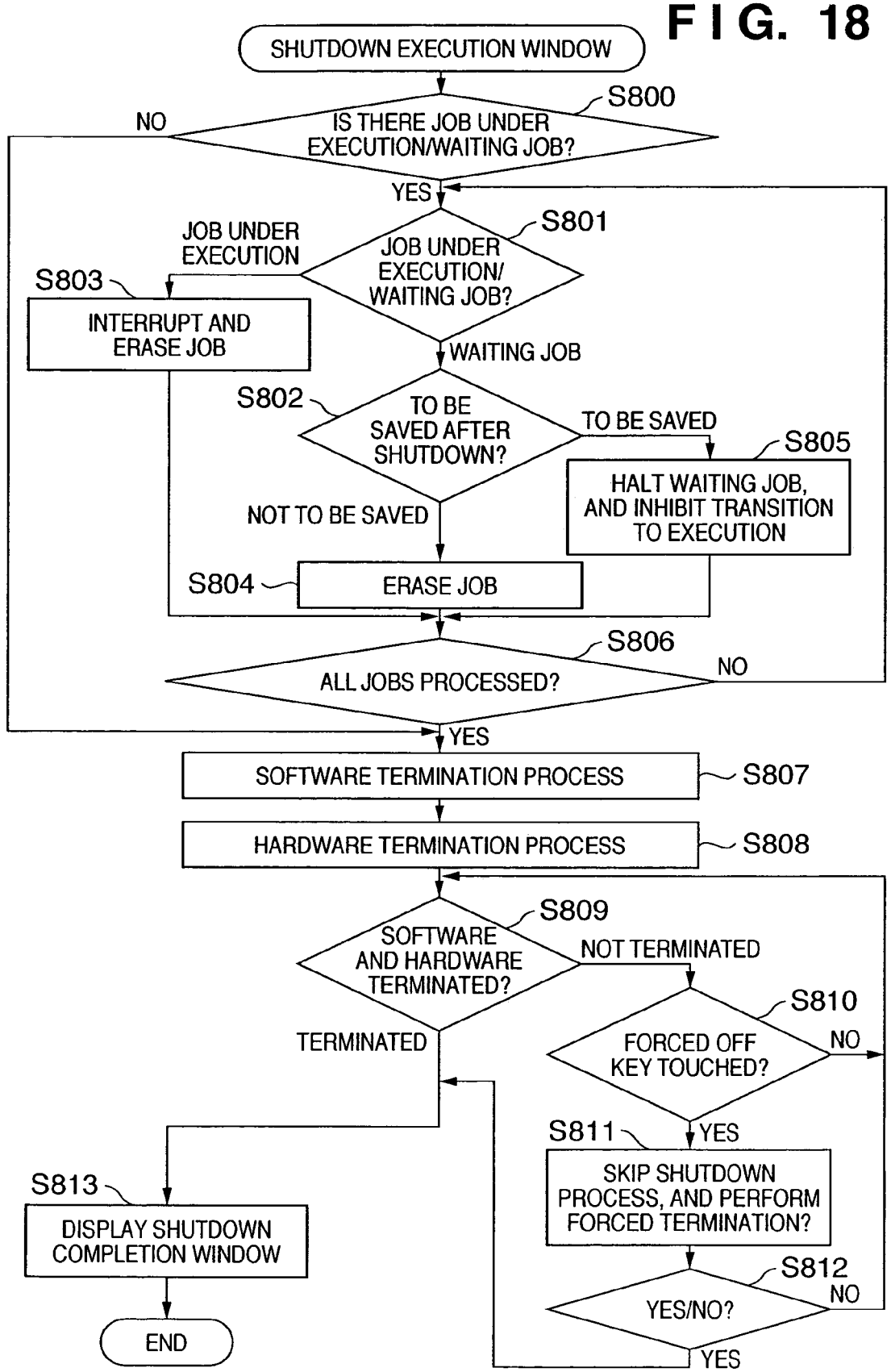
FIG. 18 is a flowchart of a series of processes of advancing to a shutdown completion window after displaying the shutdown execution window.

A series of processes of displaying the shutdown execution window and advancing to the shutdown completion window will be explained below with reference to FIG. 18 showing the flowchart of the processes. Note that programs and data for allowing the system controller 207 (including the shutdown controller 212) to execute the processes following the flowchart shown in FIG. 18 are stored in the system memory 205. The system controller 207 performs the processes explained below by using these programs and data.

After the shutdown execution window is displayed by the display process flowchart of the first or second shutdown confirmation window described above, a process in step S800 is performed first. In step S800, the shutdown controller 212 refers to the job information stored in the individual areas of the system memory 205, and checks whether there is job information of a job under execution or job information of a waiting job. The "individual areas" are the "job under execution area" and "waiting job area", or the "COPY area", "FAX area", and "print area". If there is job information of a job under execution or job information of a waiting job, the flow advances to step S801; if not, the flow advances to step S807.

In step S801, the shutdown controller 212 refers to the job information in the system memory 205. If this job information is job information of a job under execution (if a job under execution exists), the flow advances to step S803. If the job information is job information of a waiting jog (if a waiting job exists), the flow advances to step S802.

In step S802, if the waiting job information is job information of a job to be saved after shutdown, the flow advances to step S805. If the waiting job information is job information of a job not to be saved after shutdown, the flow advances to step S804.

In step S803, the job under execution is interrupted and erased from the HD 210. After a series of these job canceling processes are performed, the flow advances to step S806.

Similarly, in step S804, the job information of the waiting job not to be saved after shutdown is erased from the HDD 210. After a series of these job canceling processes are performed, the flow advances to step S806.

On the other hand, in step S805, the waiting job to be saved after shutdown is temporarily stopped, and the transition to execution of the job is inhibited. After that, the flow advances to step S806. Since the job is not cancelled but only temporarily stopped in this process, this temporarily stopped job can be activated again when the power supply is turned on next.

Then, in step S806, the shutdown controller 212 checks whether jobs corresponding to all job information in the system memory 205 are processed, i.e., whether the process in steps S803, S804, or S805 is performed for all jobs.

If all the jobs are processed, the flow advances to step S807; if not, the flow returns to step S801.

In step S807, the shutdown controller 212 performs a software termination process including a font download process and system download process, other than the processes concerning the jobs described above. The flow then advances to step S808.

In step S808, the shutdown controller 212 performs a process of terminating hardware such as the printer, scanner, and facsimile device. An example is a process of returning a movable unit of the optical system of the scanner to the home position. The hardware termination process, of course, also includes a process of returning other movable units of the digital MFP 102 to the initial positions. The flow then advances to step S809.

In step S809, these termination processes in steps S807 and S808 are monitored. If all the software and hardware termination processes are completed, it is determined that shutdown is completed, and the flow advances to step S813. In step S813, the shutdown completion window shown in FIG. 15 is displayed on the liquid crystal display 301, and the processing is terminated. If the termination processes are not completed, the flow advances to step S810.

In step S810, whether the forced OFF key 1301 displayed in the shutdown execution window shown in FIG. 13 is designated (touched) is checked. If YES in step S810, the flow advances to step S811. If NO in step S810, the flow returns to step S809.

In step S811, the window shown in FIG. 14, i.e., a message for confirming whether to interrupt the software or hardware termination process and perform the shutdown process, is displayed on the liquid crystal display 301. After that, the flow advances to step S812. In this embodiment, a message in the window shown in FIG. 14 is used as an example of this message. However, a message to be displayed may also be changed in accordance with the status of the software or hardware processing, i.e., in accordance with whether the software is unprocessed, the hardware is unprocessed, or both the software and hardware are unprocessed.

If in step S812 it is sensed that the user has touched the button image 1201 of "YES" in the message displayed in step S811, the completion of the software and hardware termination processes is skipped. In addition, the process of updating the apparatus information is interrupted, and the flow advances to step S813.

On the other hand, if it is sensed that the user has touched the button image 1202 of "NO", the flow returns to step S809. Note that if the termination of the software and hardware is detected while a touch on the button image 1201 or 1202 is waited for, the flow advances to step S813 without waiting for the touch.

In step S813, the window shown in FIG. 15, i.e., the window for notifying the completion of shutdown is displayed on the liquid crystal display 301. After that, protection of the HDD device and closure of the LAN device as the final processes of the system are performed. In addition, the relay of the facsimile line is set in a state in which only conversations are possible, the power supplies except for the display power supply are turned off, and all software tasks are halted. In this manner, the overall shutdown sequence is completed.

By executing the shutdown sequence as described above, the power supply of the digital MFP 102 can be shut down without accessing the HDD 210. This makes it possible to avoid dangers such as a crash of the HDD which occurs when the power supply is shut down by mistake while the HDD is being accessed.

In addition, since the hardware termination process is performed, the power supply of the digital MFP 102 can be shut down after the hardware of the digital MFP 102 is correctly set in the initial state. Therefore, the apparatus can be correctly activated when the power supply is turned on next.

In this embodiment as has been explained above, the shutdown mode is executed before the power supply of the apparatus main body is shut down, and jobs under execution and waiting jobs which are canceled (erased) when shutdown is executed are displayed in the confirmation window in a form which the user can readily understand. Also, if a job such as a secure print job which is not executed unless the user performs a predetermined operation has been input, the existence of the job is displayed in a form which appeals to the user.

Accordingly, the user can easily understand the presence/absence of a job which is affected by the shutdown process and the contents of the job by only monitoring a job list displayed in the shutdown confirmation window. This makes it possible to avoid job interruption or cancellation which the user does not intend, when the shutdown process is performed.

When shutdown is executed, it is also possible to cancel or temporarily stop job operations such as copying, facsimile transmission/reception, and printing. In addition, shutdown can be terminated after software other than jobs and hardware such as the scanner, printer, and facsimile device are terminated.

Note that the MFP according to this embodiment is explained by taking a digital MFP having a copying function, printing function, and facsimile function as an example. However, the MFP may also be a digital MFP having a send function as a network transmission/reception job such as FTP or IFAX which uses a network.

Second Embodiment

In the above embodiment, only information on jobs which are affected (interrupted or canceled) by the shutdown process is displayed. However, it is also possible to display information on all input jobs. In this case, it is desirable to display jobs which are affected by the shutdown process such that the user can readily recognize these jobs.

Also, information on jobs which are affected by the shutdown process may also be displayed in a form other than the form described above, provided that the display form allows the user to readily recognize the presence/absence of each job which is affected by the shutdown process and the contents of the job.

In addition, the presence/absence of a job which is affected by the shutdown process and the contents of the job may also be printed out in a predetermined form, rather than displayed on an operation display unit 203 (a liquid crystal display 301).

Furthermore, if there is no job which is affected by the shutdown process, a window which explicitly presents this information to the user may also be displayed.

The present invention is applicable to a system comprising a plurality of apparatuses, or to an apparatus (e.g., a digital multifunction peripheral) comprising a single device.

Note that the present invention can also be achieved by supplying the program (in the embodiment, the program corresponding to the flowcharts shown in FIGS. 16A to 18) of software for implementing the functions of the above-mentioned embodiments to a system or apparatus directly or from a remote place, and allowing a computer of the system or apparatus to read out and execute the supplied program code. In this case, the form is not limited to a program as long as the functions of the program are achieved.

Accordingly, the program code itself installed in the computer to implement the functional processing of the present invention by the computer also implements the present invention. That is, the scope of claims of the present invention includes the computer program itself for implementing the functional processing of the present invention.

The form of the program is not particularly limited as long as the functions of the program are achieved. Examples are an object code, a program executed by an interpreter, and script data to be supplied to an OS.

Examples of a recording medium for supplying the program are a flexible disk, hard disk, optical disk, magnetooptical disk, MO, CD-ROM, CD-R, CD-RW, magnetic tape, nonvolatile memory card, ROM, and DVD (DVD-ROM and DVD-R).

The program can also be supplied by connecting to a site of the Internet by using a browser of a client computer, and downloading the computer program itself of the present invention or a compressed file including an automatic installation function from the site to a recording medium such as a hard disk. It is also possible to divide the program code forming the program of the present invention into a plurality of files, and download the individual files from different sites. That is, the scope of claims of the present invention includes a WWW server which allows a plurality of users to download a program file for implementing the functional processing of the present invention by a computer.

Furthermore, the program of the present invention can also be encrypted and distributed to users by storing the program in a storage medium such as a CD-ROM. In this case, a user who has cleared predetermined conditions is allowed to download key information for decryption from a site across the Internet. The encrypted program is executed by using the key information, and the functional processing of the present invention is implemented by installing the program in the computer.

Also, besides the functions of the above embodiments are implemented by executing the readout program code by the computer, the functions of the embodiments can be implemented when an OS or the like running on the computer performs part or the whole of actual processing on the basis of instructions by the program.

Furthermore, the functions of the above embodiments can be implemented when the program read out from the storage medium is written in a memory of a function expansion board inserted into the computer or of a function expansion unit connected to the computer, and a CPU or the like of the function expansion board or function expansion unit performs part or the whole of actual processing on the basis of instructions by the program.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-231437 filed on Aug. 6, 2004, and No. 2005-208061 filed on Jul. 19, 2005, which are hereby incorporated by reference herein.

What is claimed is:

1. An image processing apparatus which performs image processing on the basis of an input job, comprising:
a holding unit adapted to hold information on an input job;
a determining unit adapted to determine whether there is a job under execution or whether there is a waiting job, when a shutdown instruction to shut down a power supply of the image processing apparatus is input;
a display unit adapted to display information about a job under execution if the job under execution is found by the determination by said determining unit, or information about a waiting job if the waiting job is found by the determination by said determining unit, in order to make a user confirm continuation of execution of the shutdown if the shutdown instruction is input;
a first cancellation unit adapted to if the job under execution is found by the determination by said determining unit, cancel the found job under execution without waiting for completion of the found job under execution when a shutdown continuation instruction is input after displaying the information by said display unit;
a second cancellation unit adapted to if the waiting job is found by the determination by said determining unit, cancel the found waiting job without executing the found waiting job when the shutdown continuation instruction is input after displaying the information by said display unit;
a shutdown control unit adapted to perform a control process of shutting down the power supply of the image processing apparatus after canceling jobs by said first and second cancellation units.

2. The apparatus according to claim 1, wherein said display unit displays a list by grouping information on a job under execution and information on a waiting job which is not saved in said holding unit after the power supply of the image processing apparatus is shut down, such that the former and latter pieces of information are distinguished from each other.

3. The apparatus according to claim 1, wherein the display unit displays information on input jobs by grouping the jobs in accordance with types of image processing of the jobs.

4. The apparatus according to claim 3, wherein the types of image processing include a copying function, facsimile function, and printing function.

5. The apparatus according to claim 1, wherein
said display unit further displays a confirmation window for confirming whether to shutdown the power supply of the image processing apparatus, and, if a shutdown instruction is input while the confirmation window is displayed,
said first cancellation unit interrupts and erases a job under execution among other jobs displayed in the form of a list,
said second cancellation unit erases a waiting job which is not to be saved after shutdown among other jobs displayed in the form of a list, inhibits transition to execution of a waiting job which is to be saved after shutdown among other jobs displayed in the form of a list, and
said display unit displays a window indicating that shutdown is to be performed, and controls a shutdown process.

6. The apparatus according to claim 5, wherein said shutdown control unit interrupts the shutdown process if an instruction to forcedly shut down the power supply of the image processing apparatus is input while the window indicating that shutdown is to be performed is displayed by said display unit.

7. The apparatus according to claim 1, wherein a confirmation window for confirming whether to shut down the power supply of the image processing apparatus is displayed, if a process of updating information which the image processing apparatus holds in the apparatus is performed while said shutdown control unit is executing the control process of shutting down the power supply of the image processing apparatus.

8. The apparatus according to claim 7, wherein if a shutdown instruction is input while the confirmation window is displayed, said shutdown control unit terminates the process of updating the information which the image processing apparatus holds in the apparatus.

9. The apparatus according to claim 1,
wherein, if said determining unit determines that there is neither a job under execution nor a waiting job, and
wherein said shutdown control unit displays a window indicating that shutdown is to be performed, and controls the shutdown process, without displaying the window for confirming whether to perform shutdown.

10. The apparatus according to claim 1, wherein
the image processing apparatus has a facsimile function of performing facsimile transmission/reception, and
said shutdown control unit prohibits the facsimile function from performing facsimile reception, in response to inputting of the shutdown instruction to shut down the power supply of the image processing apparatus.

11. The apparatus according to claim 10, wherein said shutdown control unit permits the prohibited facsimile reception by the facsimile function, in response to inputting of an instruction to cancel execution of the control process of shutting down the power supply of the image processing apparatus.

12. The apparatus according to claim 1, wherein
the image processing apparatus has a facsimile function of performing facsimile transmission/reception, and
said shutdown control unit stops continuation of execution of a facsimile transmission/reception job which is waiting for execution, in response to inputting of the shutdown instruction to shut down the power supply of the image processing apparatus.

13. The apparatus according to claim 12, wherein said shutdown control unit resumes the execution of the facsimile transmission/reception job which is waiting for execution and the continuation of the execution of which is stopped, in response to inputting of an instruction to cancel execution of the control process of shutting down the power supply of the image processing apparatus.

14. A control method of an image processing apparatus which performs image processing on the basis of an input job, comprising:
a holding step of holding information on an input job in a memory;
a determination step of determining whether there is a job under execution or whether there is a waiting job, on the basis of the information held in the memory, when a shutdown instruction to shut down a power supply of the image processing apparatus is input;
a display step of displaying information about a job under execution if the job is found by the determination process in the determination step, or information about a waiting job if the job is found by the determination process in the determination step in order to make a user confirm continuation of execution of the shutdown if the shutdown instruction is input;
a first cancellation step of, if the job under execution is found by the determination by said determining step, cancel the found job under execution without waiting for completion of the found job under execution when a shutdown continuation instruction is input after displaying the information by said display step;
a second cancellation step of, if the waiting job is found by the determination by said determining step, cancel the found waiting job without executing the found waiting job when the shutdown continuation instruction is input after displaying the information by said display step;
a shutdown control step of performing a control process of shutting down the power supply of the image processing apparatus after cancelling jobs by said first and second cancellation steps.

15. A computer-readable storage medium storing a computer-executable program for causing a computer to execute a control method cited in claim 14.

* * * * *